(12) United States Patent
He

(10) Patent No.: US 12,218,892 B2
(45) Date of Patent: Feb. 4, 2025

(54) SMART MEDIA OVERLAY SELECTION FOR A MESSAGING SYSTEM

(71) Applicant: Snap Inc., Santa Monica, CA (US)

(72) Inventor: Jiayu He, Toronto (CA)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 18/118,912

(22) Filed: Mar. 8, 2023

(65) Prior Publication Data

US 2023/0318992 A1 Oct. 5, 2023

Related U.S. Application Data

(60) Provisional application No. 63/362,376, filed on Apr. 1, 2022.

(51) Int. Cl.
| | |
|---|---|
| *G06F 15/16* | (2006.01) |
| *G06F 40/205* | (2020.01) |
| *G06F 40/247* | (2020.01) |
| *H04L 51/04* | (2022.01) |
| *H04L 51/10* | (2022.01) |
| *H04L 51/52* | (2022.01) |

(52) U.S. Cl.
CPC ............ *H04L 51/04* (2013.01); *G06F 40/205* (2020.01); *G06F 40/247* (2020.01); *H04L 51/10* (2013.01); *H04L 51/52* (2022.05)

(58) Field of Classification Search
CPC ......... H04L 51/04; H04L 51/52; H04L 51/10; G06F 40/247; G06F 40/205
USPC .......................... 709/206, 203, 204, 217, 223
See application file for complete search history.

(56) References Cited

U.S. PATENT DOCUMENTS

| | | | |
|---|---|---|---|
| 11,405,349 B1* | 8/2022 | Veeramuthu | .......... H04L 51/212 |
| 2006/0053203 A1* | 3/2006 | Mijatovic | ............. H04L 51/212 |
| | | | 709/206 |
| 2011/0225250 A1* | 9/2011 | Cypes | .................. G06Q 10/107 |
| | | | 709/206 |

(Continued)

FOREIGN PATENT DOCUMENTS

| | | |
|---|---|---|
| KR | 20060095712 | 9/2006 |
| KR | 20090084619 | 8/2009 |

(Continued)

OTHER PUBLICATIONS

"International Application Serial No. PCT US2023 017138, International Search Report mailed Jul. 31, 2023", 3 pgs.

(Continued)

*Primary Examiner* — Kaylee J Huang
(74) *Attorney, Agent, or Firm* — Schwegman Lundberg & Woessner, P.A.

(57) ABSTRACT

A text string provided by a second client device of a second user is received by a first client device of a first user. The text string is parsed into one or more text portions. A score is assigned to each of the one or more text portions based on a specified criterion. One or more relevant tags of a plurality of tags are determined based on the one or more text portions. One or more media overlays are selected based on the one or more relevant tags and the assigned score for each of the one or more text portions. The text string with a reply interface for sending a reply message to the second client device is displayed.

20 Claims, 18 Drawing Sheets

(56) References Cited

U.S. PATENT DOCUMENTS

| | | | |
|---|---|---|---|
| 2014/0046976 A1* | 2/2014 | Zhang | G06F 16/00 |
| | | | 707/772 |
| 2014/0282237 A1* | 9/2014 | Fuzell-Casey | G06Q 30/0601 |
| | | | 715/810 |
| 2015/0058103 A1* | 2/2015 | Kirk | G06Q 30/0214 |
| | | | 705/14.16 |
| 2016/0239847 A1* | 8/2016 | Arvapally | G06Q 30/016 |
| 2017/0185581 A1 | 6/2017 | Bojja et al. | |
| 2019/0005049 A1* | 1/2019 | Mittal | G06F 16/3347 |
| 2019/0121608 A1* | 4/2019 | Dolph | G06F 8/38 |
| 2020/0106726 A1* | 4/2020 | Pham | G06F 40/56 |

FOREIGN PATENT DOCUMENTS

| | | |
|---|---|---|
| KR | 20210084742 | 7/2021 |
| WO | 2016007122 | 1/2016 |
| WO | WO-2023192608 A1 | 10/2023 |

OTHER PUBLICATIONS

"International Application Serial No. PCT US2023 017138, Written Opinion mailed Jul. 31, 2023", 4 pgs.

* cited by examiner

| SCORE | CATEGORY | EXAMPLE |
|---|---|---|
| 13 | Emoji (to do) | 😆 |
| 12 | Any phrase with !/?! | Seriously?! Oh Yeah?! |
| 11 | Holiday/Celebration phrase | Happy birthday, Happy Mother's day |
| 10 | Holiday word | Halloween |
| 9 | Internet Chat Abbreviation | WTF, FML, 420, BFFs, TYVM, TTYL |
| 8 | Emotional Common Phrase | What the hell, good luck, go to hell |
| 7 | Emotional single word | happy, sad, hate, confused, hell |
| 6 | Common phrase | Go to school, safe travel, see a doctor, see a movie |
| 5 | Adjective/Adverb | Humid, sweating, windy |
| 4 | Verb | Run, swim |
| 3 | Noun phrase | Gas station, office work |
| 2 | Noun word/Numeral | School, beach, tooth |
| 1 | Common stop words | to, a, an, such, about |
| 0 | Any other words that do not appear in tag database | AK47, xxxeyyoo, covid20 |

FIG. 9

SMART MEDIA OVERLAY SELECTION FOR A MESSAGING SYSTEM

CLAIM OF PRIORITY

This application claims the benefit of priority to U.S. Provisional Application Ser. No. 63/362,376, filed on Apr. 1, 2022, which is incorporated herein by reference in its entirety.

BACKGROUND

Messaging systems provide for the exchange of message content between users. For example, a messaging system allows a user to exchange message content (e.g., text, images) with one or more other users.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which:

FIG. 9 illustrates an example tag score table in accordance with some embodiments.

DETAILED DESCRIPTION

A messaging system typically allow users to exchange content items (e.g., messages, images and/or video) with one another in a message thread. A messaging system may implement or otherwise work in conjunction with a media overlay system configured to maintain a collection of media overlays for use in messaging between users (e.g., friends). The disclosed embodiments provide for a messaging client to select one or more media overlays that correspond accurately to received and/or input text in a chat. This may be done by parsing the text and determining one or more tags that are relevant to each parsed word and/or phrase within the text. The determined tags can be used to select one or more associated media overlays that are relevant to the text. It is to be understood that while some figures herein use a sticker as an example of a media overlay, any type of media overlay can be used.

Networked Computing Environment

Figure 1:
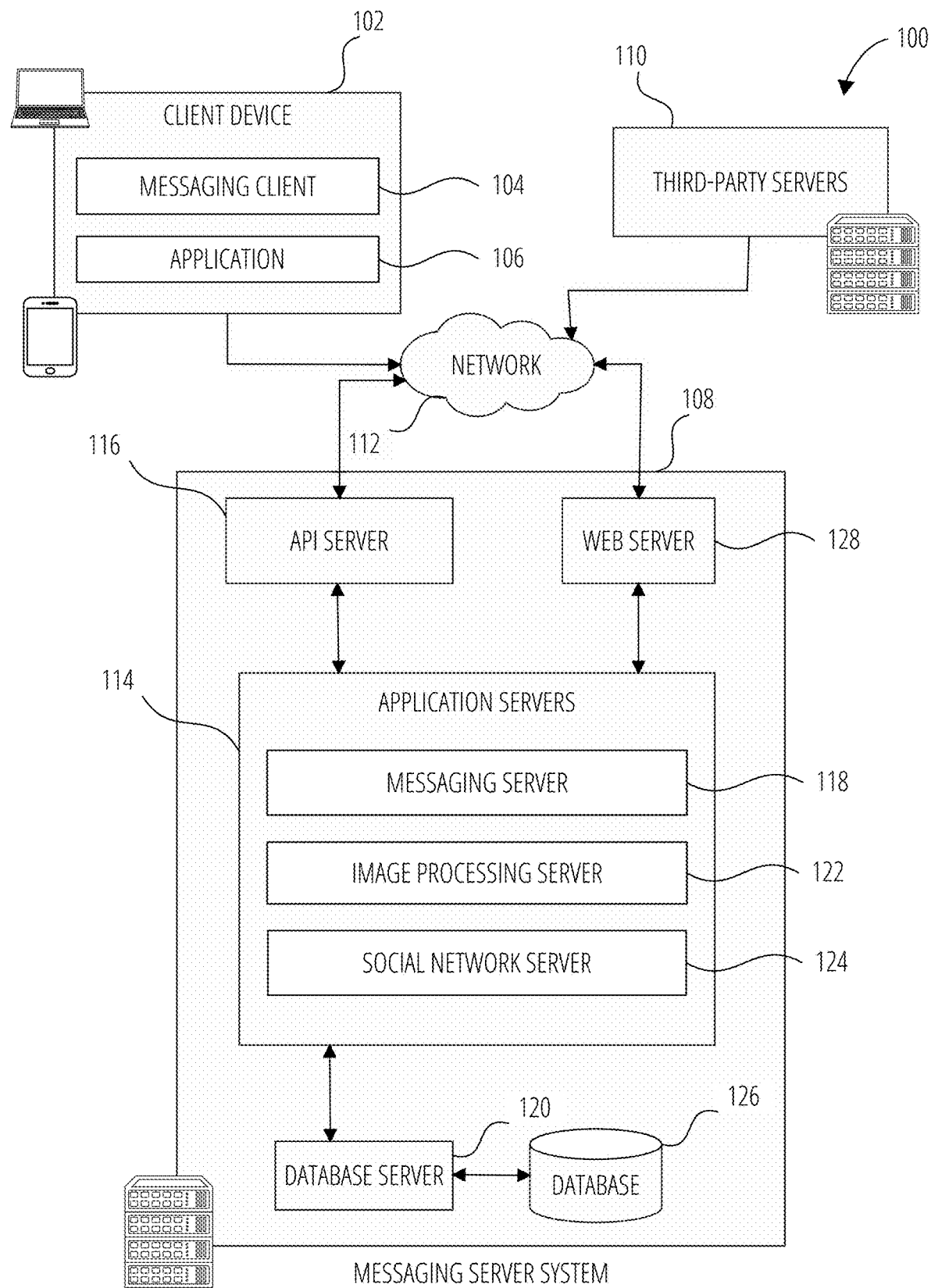
FIG. 1 is a diagrammatic representation of a networked environment in which the present disclosure may be deployed, in accordance with some examples.

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
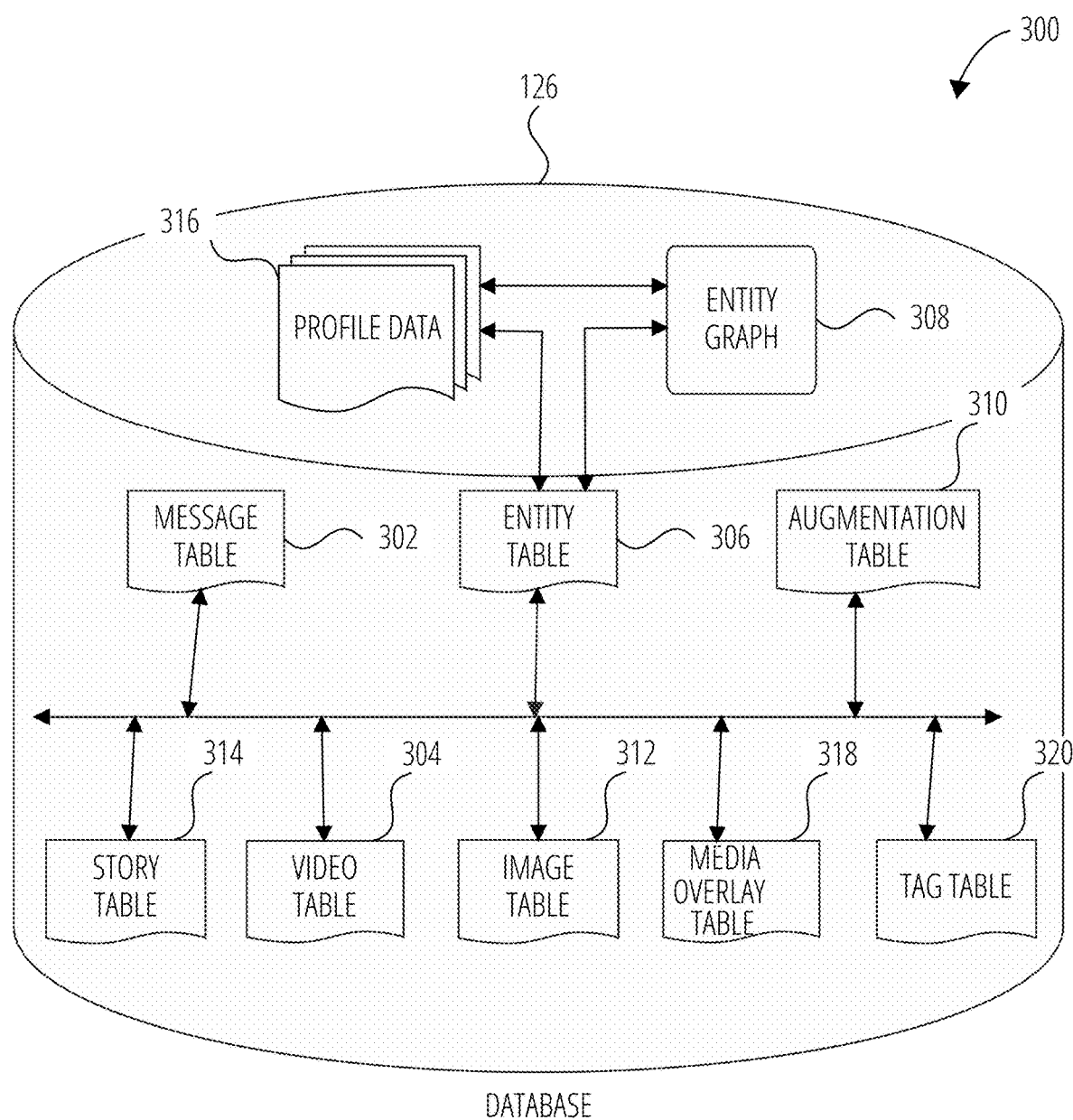
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an application 106 or applet) are made available to a user via an interface of the messaging client 104. In this context, "external" refers to the fact that the application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
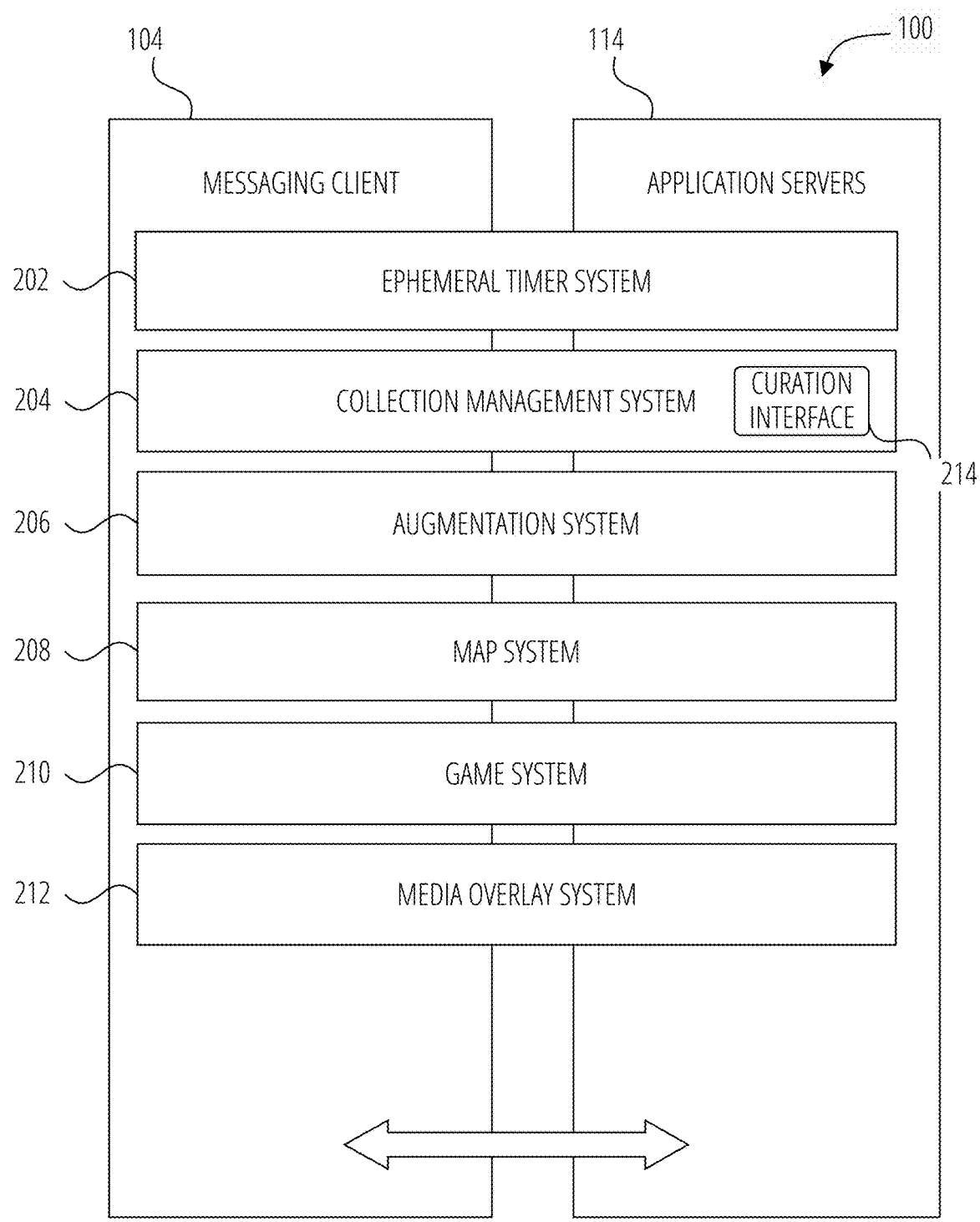
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the sever-side by the application servers 114. These subsystems include, for example, an ephemeral timer system 202, a collection management system 204, an augmentation system 206, a map system 208, a game system 210, and/or a media overlay system 212.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 214 that allows a collection manager to manage and curate a particular collection of content. For example, the curation interface 214 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 206 provides various functions that enable a user to augment (e.g., annotate or otherwise modify or edit) media content associated with a message. For example, the augmentation system 206 provides functions related to the generation and publishing of media overlays for messages processed by the messaging system 100. The augmentation system 206 operatively supplies a media overlay or augmentation (e.g., an image filter) to the messaging client 104 based on a geolocation of the client device 102. In another example, the augmentation system 206 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 206 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 206 provides a user-based publication platform that enables users to select a geolocation on a map and upload content associated with the selected geolocation. The user may also specify circumstances under which a particular media overlay should be offered to other users. The augmentation system 206 generates a media overlay that includes the uploaded content and associates the uploaded content with the selected geolocation.

In other examples, the augmentation system 206 provides a merchant-based publication platform that enables merchants to select a particular media overlay associated with a geolocation via a bidding process. For example, the augmentation system 206 associates the media overlay of the highest bidding merchant with a corresponding geolocation for a predefined amount of time.

The map system 208 provides various geographic location functions, and supports the presentation of map-based media content and messages by the messaging client 104. For example, the map system 208 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 210 provides various gaming functions within the context of the messaging client 104. The messaging client 104 provides a game interface providing a list of available games that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The media overlay system 212 provides various media overlay functions within the context of the messaging system 100. As described herein, a media overlay is a digital image or icon used in messaging. A media overlay may be placed or added (e.g., at a user-defined position) within a message. A media overlay may accompany other content (e.g., text and/or images) within a message. Alternatively, a media overlay may itself correspond to the entirety of a message. In one or more embodiments, the media overlay system 212 is configured to maintain a collection of media overlays that are available for messaging with respect to the messaging client 104. Moreover, the media overlay system 212 may implement a recommendation system configured to select, from among the collection of available media overlays, a recommended set of media overlays for use in messaging. For example, when viewing a particular media content item (e.g., a message with media content, a Story, etc.) provided by another user, the messaging client 104 may present the selected set of media overlays within a reply interface. A user may select a media overlay, from among the selected set of media overlays, for including in a reply message to the media content item provided by the other user.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

In one or more embodiments, the database 126 also stores a media overlay table 318 for storing a collection of media overlays. For example, the media overlay table 318 stores an indication (e.g., a list) of media overlays available for selection by a user of the messaging client 104. As discussed above, the collection of media overlays is maintained by the media overlay system 212, with each media overlay corresponding to a digital image or icon. For example, the media overlays stored within the media overlay table 318 may include one or more of emojis, graphics-based symbols, graphics with words incorporated therein, pictures, animated images, or other types of digital images/icons.

In one or more embodiments, one or more media overlays in the media overlay table 318 are associated with different attributes (e.g., different moods/expressions). These attributes can be based on one or more tags found in the tag table 320. For example, a particular media overlay may be associated with one or more predefined words using metadata labels, designations, and the like that associate with a respective mood/expression. As discussed below, the messaging client 104 may search the predefined words stored in the media overlay table 318 to identify one or more media overlays associated with a particular term (e.g., a text-based term).

Data Communications Architecture

Figure 4:
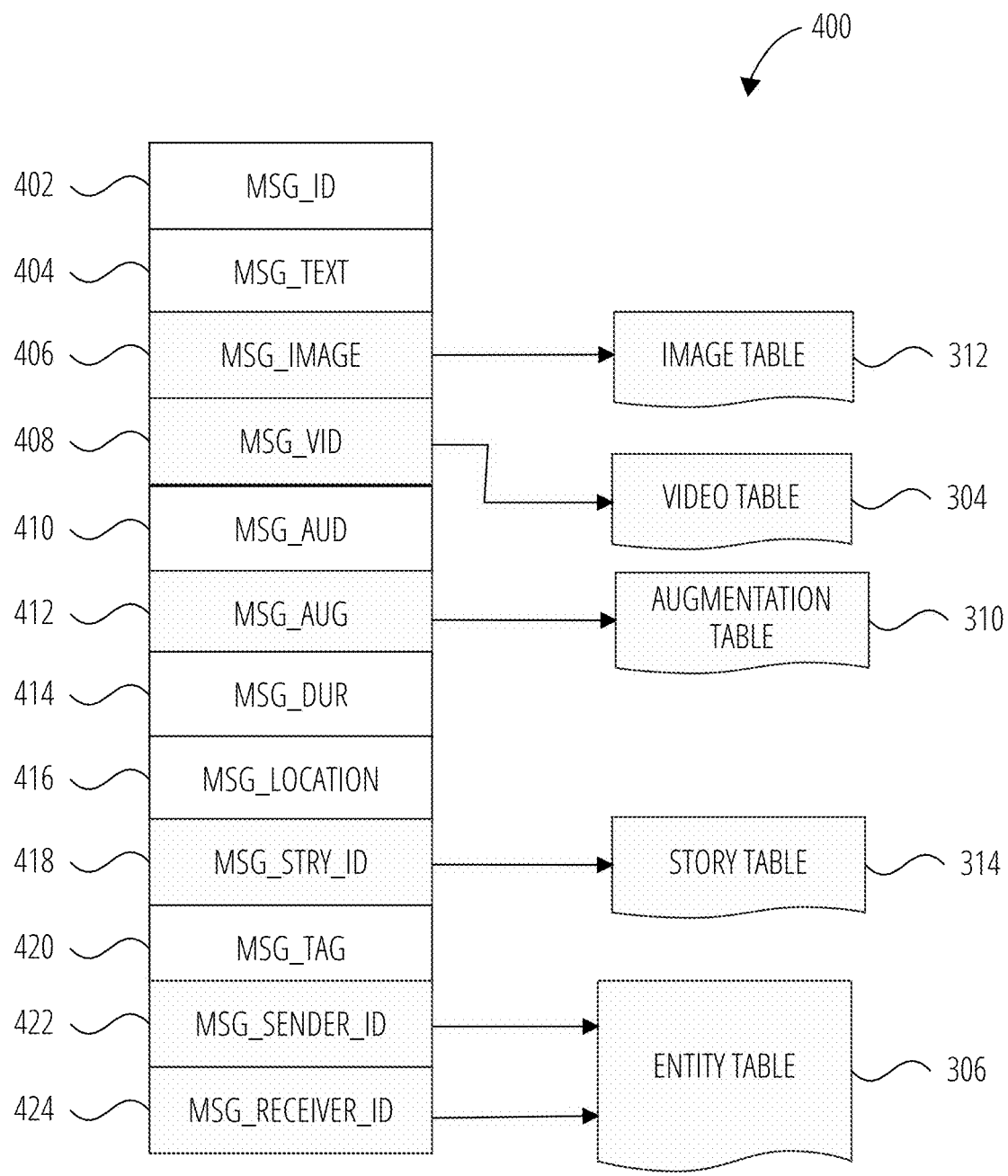
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, media overlays, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the Client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentations 412 may point to data stored in an augmentation table 310, values stored within the message story identifier 418 may point to data stored in a story table 314, and values stored within the message sender identifier 422 and the message receiver identifier 424 may point to user records stored within an entity table 306.

According to various embodiments, It may be difficult to accurately recommend one or more media overlays that correspond to the text if there are more than a specified number of words (e.g., more than 5 words or more than 8 words). If a media overlay recommendation algorithm can capture message semantics and find the better media overlay more accurately, users may be more likely to click on the button and share a bitmoji media overlay. This may increase the bitmoji media overlay share rate. Embodiments described herein involve ways to analyze the user text and find one or more media overlays that can accurately correspond to the meaning behind text in a chat. This algorithm may mainly include two steps: 1. pre-processing to generate a model; and 2. use and run the model on the client device, e.g., in a C++ library on the client device. The pre-processing step may be at least partially accomplished on the server. In some cases, at least a portion of the pre-processing step is completed on the client device. The media overlay recommendation algorithm may not increase or not substantially increase the application size on the client device. Additionally, the algorithm may not substantially increase the memory usage for the application. For example, the model may be in proto format and may increase the memory usage by about 40 KB.

Figure 5:
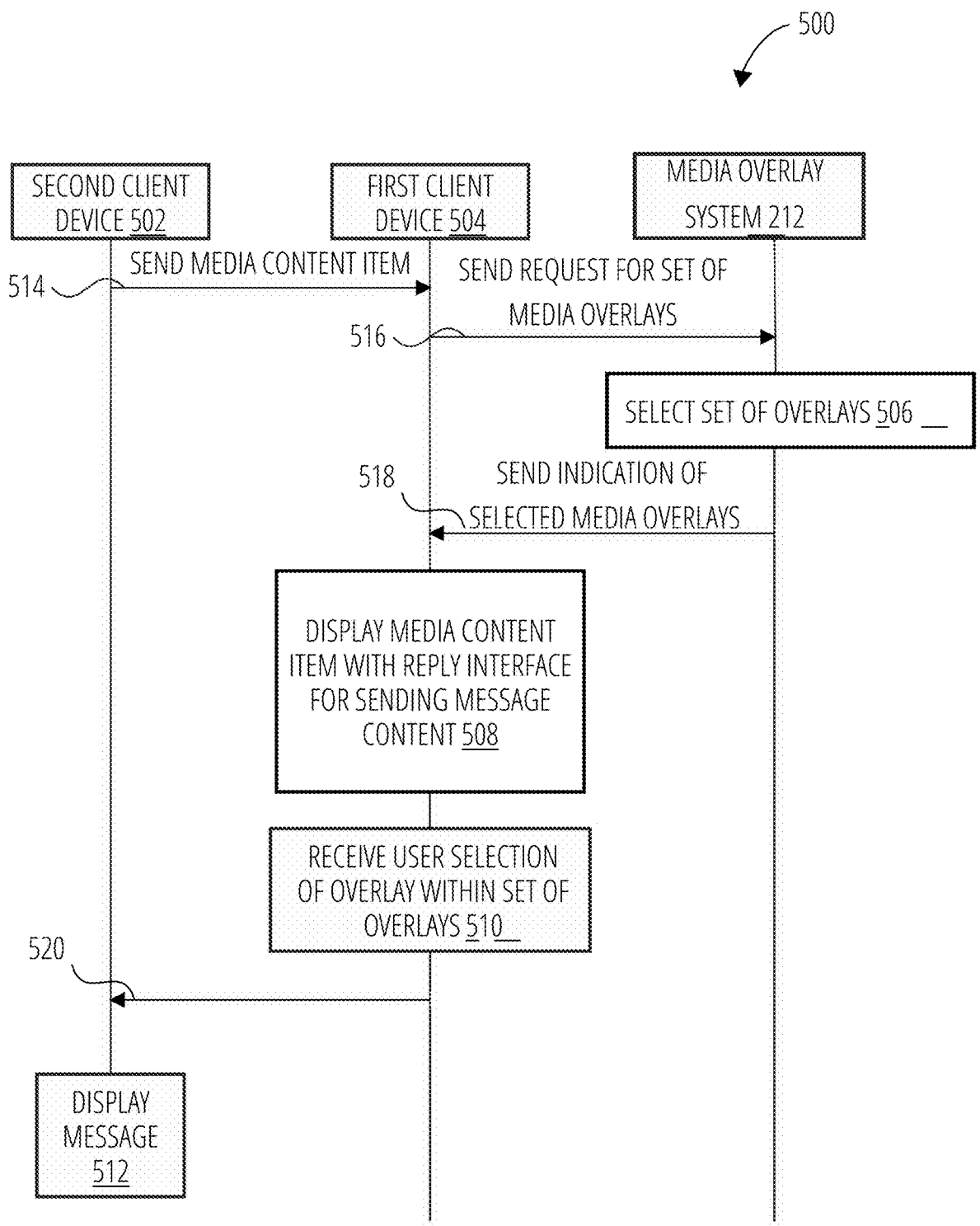
FIG. 5 is an interaction diagram illustrating a process for providing a reply interface with selectable media overlays for sending in a message, in accordance with some example embodiments.

FIG. 5 is an interaction diagram illustrating a process 500 for providing a reply interface with selectable media overlays (e.g., stickers) for sending in a message, in accordance with some example embodiments. For explanatory purposes, the process 500 is primarily described herein with reference to a first client device 502 and a second client device 504 (e.g., each of which may correspond to a respective client device 102), and with reference to the media overlay system 212. However, one or more blocks (or operations) of the process 500 may be performed by one or more other components, and/or by other suitable devices. Further for explanatory purposes, the blocks (or operations) of the process 500 are described herein as occurring in serial, or linearly. However, multiple blocks (or operations) of the process 500 may occur in parallel or concurrently. In addition, the blocks (or operations) of the process 500 need not be performed in the order shown and/or one or more blocks (or operations) of the process 500 need not be performed and/or can be replaced by other operations. The process 500 may be terminated when its operations are completed. In addition, the process 500 may correspond to a method, a procedure, an algorithm, etc.

Each of the first client device 502 and the second client device 504 may have instances of the messaging client 104 installed thereon. The first client device 502 and the second client device 504 may be associated with a respective first user and second user of the messaging server system 108. For example, the first user may be associated with a first user account of the messaging server system 108, and the second user may be associated with a second user account of the messaging server system 108. As noted above, the first and second users may be identified by the messaging server system 108 based on unique identifiers (e.g., a messaging system identifier, email address and/or a device identifier) associated with respective user accounts for the first and second users. In addition, the messaging server system 108 may implement and/or work in conjunction with the social network server 122 which is configured to identify other users (e.g., friends) with which a particular user has relationships.

As described herein, the messaging client 104 running on the first client device 502 is configured to display a reply interface in conjunction with displaying a media content item (e.g., text with or without media content) provided by the second user. The reply interface includes a media overlay selection interface that when activated displays a set of selectable media overlays to the first user. The set of media overlays may be chosen based on the received media content item. In some cases, at least some media overlays of the set of media overlays are ranked with regard to relevancy with the received media content item.

At operation 514, the second client device 504 of the second user sends a media content item to the first client device 502. For example, the media content item may correspond to a message (e.g., with or without media content) or a Story (e.g., a collection of media content) that was directly sent by the second user to the first user via the messaging server system 108. In another example, the media content item corresponds to a Story broadcast by the second user, and selected for viewing by the first user via the messaging server system 108.

At operation 516, the first client device 502 sends a request for a set of media overlays to the media overlay system 212. In some cases, the request may be based on the text meeting or exceeding a number of words. For example, the first client device 502 may send a request for media overlays to the media overlay system based on a determination that the text is at least 5 words or at least 8 words. As noted above, the media overlay system 212 is configured to maintain a collection of media overlays (e.g., stored in the media overlay table 318) that are available for messaging, and/or to implement a recommendation system for selecting set(s) of media overlays for replying to received media content items.

As also noted above, the media overlay system 212 may correspond to a subsystem of the messaging system 100, and may be supported on the client side by the messaging client 104 (e.g., of the first client device 502) and/or on the server side by the application servers 114. Thus, in one or more embodiments, the above-mentioned maintaining of the collection of media overlays and/or the recommendation system for selecting set(s) of media overlays may be implemented client side, server side and/or a combination of client side and server side.

At block 506, the media overlay system 212 selects the set of media overlays. In one or more embodiments, the media overlay system 212 is configured to select a preset number of media overlays from among the collection of available media overlays stored by the media overlay table 318. For example, while the collection of available media overlays may include hundreds of media overlays, the media overlay system 212 may set the preset number of media overlays to 9.

In one or more embodiments, the selected set of media overlays represents a variety of different moods/expressions. As noted above, the media overlay table 318 may store attributes (e.g., predefined words), corresponding to respective moods/expressions, in association with media overlays. These attributes may be described as tags herein and may be stored in a tag database. In one or more embodiments, the selected set of media overlays may include respective media overlays associated with one or more of the following moods/expressions: love (e.g., where the media overlay is a heart image and/or depicts words such as "love"); laughing (e.g., a laughing face icon and/or words such as "haha!"); an expression that the media content item is exciting (e.g., a fire icon and/or words such as "on fire" or "lit"); approval/applause (e.g., a thumbs up icon, clapping icon and/or words such as "yay!"); shock/awe (e.g., a surprised face icon and/or words such as "wow"); sadness (e.g., a crying/frowning face icon); anger (e.g., an angry face icon). As such, each media overlay in the set of media overlays may be user-selectable for conveying a respective mood/expression for sending in a message to the second client device 504 (e.g., as a response to the media content item provided by the second user).

The set of media overlays selected by the media overlay system 212 may correspond to a predefined set of media overlays, for example, that represent the above-mentioned variety of moods/expressions. Thus, in a case where the preset number of media overlays within the set is 9, the media overlay system 212 may preselect a set of 9 media overlays from among the collection of available media overlays stored in the media overlay table 318.

According to various implementations, the set of media overlays selected by the media overlay system 212 may correspond to a predefined number of media overlays (e.g., 9 media overlays) that are randomly selected set from among the collection of available media overlays (e.g., stored in the media overlay table 318). Thus, in response to the request at operation 516, the media overlay system 212 may use a random number generator to select 9 media overlays from among the collection of available media overlays. In one or more embodiments, the media overlay system 212 may randomly select an individual media overlay from each mood/expression category. For example, for each of 9 mood/expression categories, the media overlay system 212 may randomly select a corresponding media overlay for that mood/expression (e.g., based on the predefined words stored in the media overlay table 318). According to some embodiments, the media overlay system 212 provides a reference (e.g., a pointer) to the image data for the set of media overlays. At block 508, the first client device 502 displays the media content item, with the reply interface, for generating a reply message to the media content item.

In selecting the set of media overlays, the media overlay system 212 may calculate respective relevancy scores for media overlays, for example, based on a number or frequency of confirmed matches between the input term and media overlay attributes (e.g., predefined words). The relevancy scores may be used to limit the number of media overlays that are selected (e.g., the 9 media overlays with the highest relevancy scores) and/or for displaying the selected media overlays in ranked order.

At operation 518, the media overlay system 212 sends an indication of a selected set of media overlays to the first client device 502. The media overlay system 212 may also send an indication of the ranking of the media overlays (e.g., based on the relevancy scores), for display of the media overlays in ranked order. Alternatively, in a case where the calculated relevancy scores are below a predefined value (e.g., suggesting that the input term does not appear to match a mood/expression within the collection of media overlays stored in the media overlay table 318), the media overlay system 212 may instead send an indication that the set of media overlays is not be to updated.

In one or more embodiments, the first user at the first client device 502 may select a media overlay for sending to the second user at the second client device 504. In such a case, at block 510, the first client device 502 receives user selection of a media overlay within the set of media overlays (e.g., the updated set of media overlays, or the original set of media overlays in a case when the media overlays were not updated). The user selection may correspond to a predefined gesture (e.g., a tap gesture) for selecting the media overlay.

At operation 520, in response to user selection of a media overlay, the first client device 502 sends a message with the selected media overlay to the second client device 504. Moreover, in response to user selection of the media overlay, the first client device 502 may update the second reply interface, for example, by removing the keyboard interface therefrom.

At block 512, the second client device 504 displays a message including the selected media overlay to the second user. In one or more embodiments, the second client device 504 displays the received media overlay within a chat interface of the messaging client 104, for example, as part of a message thread between the first client device 502 and the second client device 504.

Figure 6:
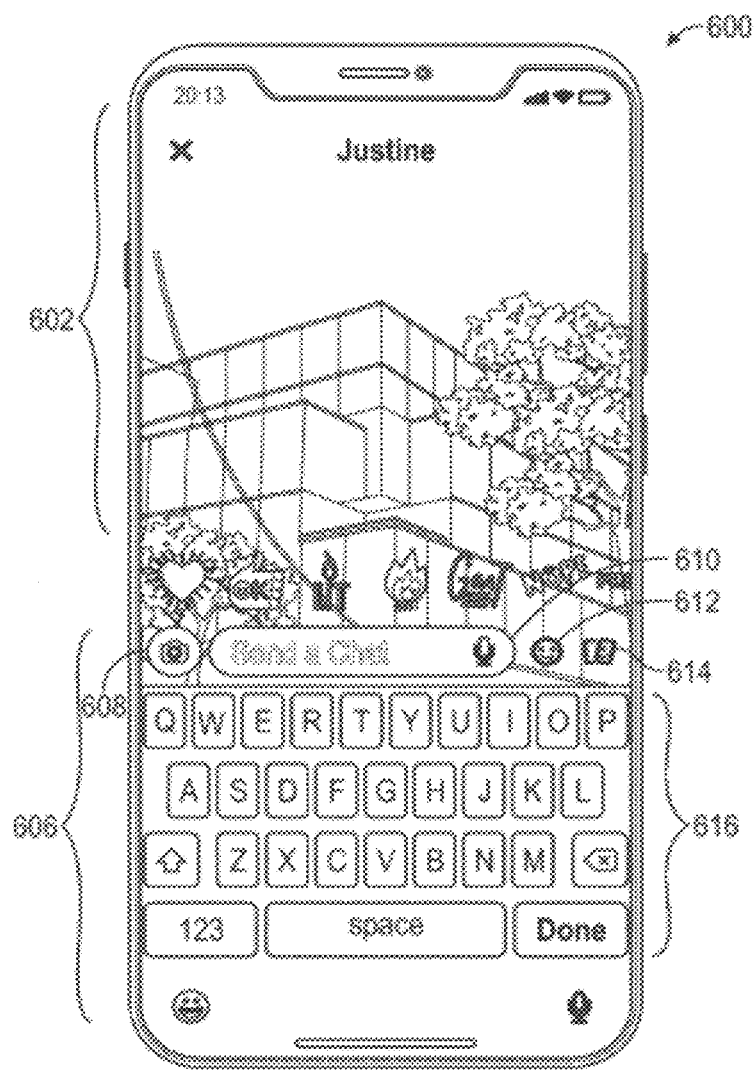
FIG. 6 illustrates an example user interface for displaying a media content item together with a reply interface for selecting a media overlay to send in a message, in accordance with some example embodiments.

FIG. 6 illustrates an example user interface 600 for displaying a media content item together with a reply interface for selecting a media overlay to send in a message, in accordance with some example embodiments. In the example of FIG. 6, the user interface 600 includes display of a media content item 602, a reply interface 604 which includes interface elements 606-614. According to various configurations, the media content item includes text.

The media content item 602 is displayed by the messaging client 104. The media content item 602 corresponds to a message (e.g., with media content and/or text) or a Story (e.g., a collection of media content). As noted above, in one or more embodiments, the reply interface 606 is provided for display with the media content item 602, for example, in response to a predefined gesture (e.g., a swipe up gesture) performed on the displayed media content item 602.

The reply interface 606 includes an input box 610 configured for user input. For example, user input may be provided by one or more of: an image capture icon 608 for capturing an image/video via a device camera for including in a reply message; a media overlay selection icon 612 for showing a set of media overlays (e.g., all or a portion of available media overlays stored in the media overlay table 318; a photo library icon 614 for selecting an image/video selected from a photo library (e.g., of the client device 102); and a keyboard interface 616 for user input of text within the input box 610.

Each media overlay in the set of media overlays is user-selectable for generating/sending a reply message which includes the selected media overlay. The set of media overlays may correspond to a variety of different moods/expressions, and include a predefined number of media overlays. In some cases, the set of media overlays includes all of the media overlays in the media overlay table 318. The set of media overlays may be displayed as a carousel interface.

As noted above, the messaging client 104 is configured to update the set of media overlays in response to text-based terms entered within the input box 610. For example, an order of media overlays in the set of media overlays may be updated in response to the input text-based terms of the first and/or second user. In one or more embodiments, the media overlay selection icon 612 may update to depict a highest-ranked media overlay (e.g., a media overlay with a highest relevancy score, as described above).

Figure 7A:
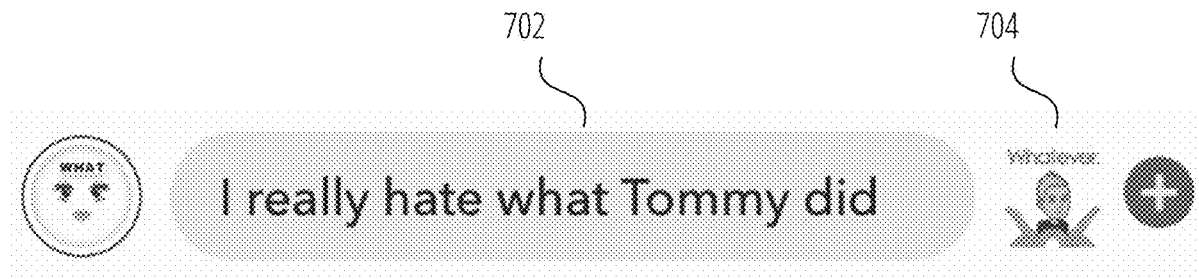
FIGS. 7A and 7B illustrate example media overlay selection in a reply message in accordance with some example embodiments.
Figure 7B:
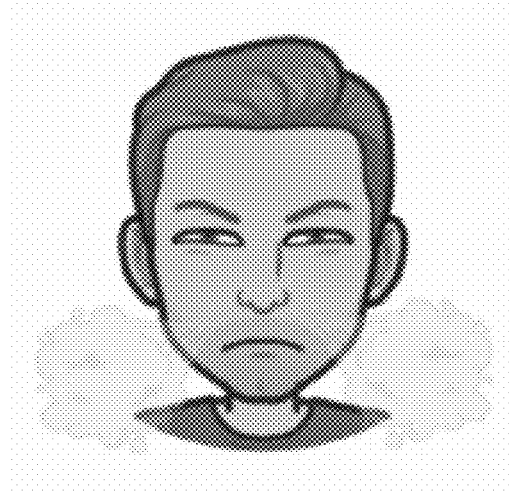

FIG. 7A illustrates an example of chat text with a media overlay recommendation that does not accurately correspond with the text 702. For the example shown in FIG. 7A, the "whatever" media overlay 704 may not be the best corresponding media overlay to the text 702. Media overlays with angry and hateful emotion might be better fit. For example, the media overlay shown in FIG. 7B might be better to recommend to the user.

Figure 8:
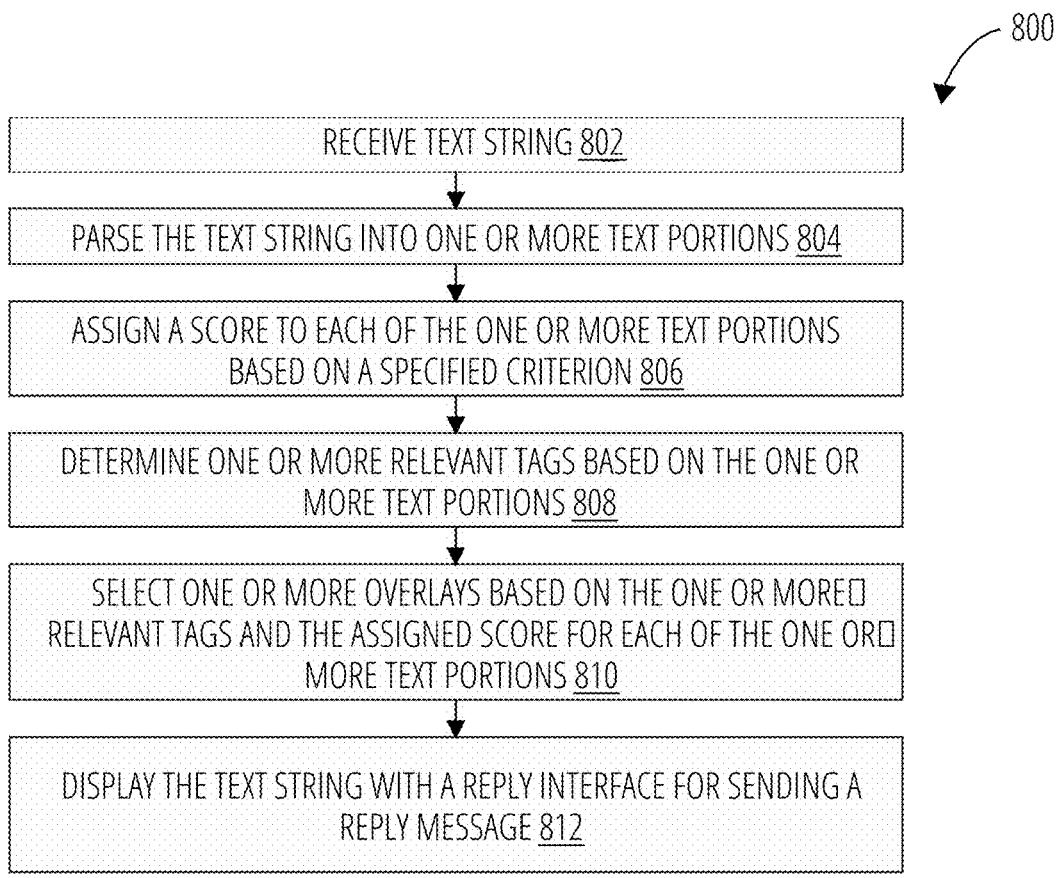
FIG. 8 is a flowchart illustrating a process for providing a smart media overlay selection in accordance with some example embodiments.

FIG. 8 illustrates a process 800 for media overlay selection based on input text in accordance with embodiments described herein. In block 802, the media overlay system 212 receives, by a first client device of a first user, a text string provided by a second client device of a second user. According to various configurations, the first user and the second user correspond to contacts within a messaging application running on each of the first client device and the second client device. The text string may include one or both of text and emojis, for example. In block 804, the media overlay system 212 parses the text string into one or more text portions. According to various configurations, the text string is parsed using natural language processing that does not involve machine learning. According to various embodiments, the one or more text portions comprise one or more words. The media overlay system 212 may be configured to determine one or both of a synonym and an antonym of at least one of the one or more words.

In block 806, the media overlay system 212 assigns a score to each of the one or more parsed text portions based on a specified criterion. The criterion may be based on the word use frequency and/or an amount of emotion associated with the word. The specified criterion may be updated at specified intervals. For example, the specified criterion may be updated daily. The specified criterion may be updated on the client device and/or at a server. In some cases, the specified criterion is updated automatically at the specified intervals.

In block 808, the media overlay system 212 determines one or more relevant tags of a plurality of tags based on the parsed one or more text portions. According to various configurations, each portion of the text string is iteratively scanned to determine the one or more relevant tags.

In block 810, the media overlay system 212 selects one or more media overlays based on the one or more relevant tags and the assigned score for each of the one or more parsed text portions. According to various embodiments, the one or more media overlays correspond to a predefined set of media overlays for displaying in a predefined order. In some cases, each of the one or more tags have an associated score and selecting the one or more media overlays comprises selecting the one or more media overlays based on the associated score of the one or more relevant tags.

In block 812, the first client device displays the text string together with a reply interface for sending a reply message to the second device. receiving, According to various configurations, user selection of a media overlay within the one or more media overlays is received via the reply interface. The first client device may provide for transmission of the selected media overlay to the second device.

Although the described flowcharts can show operations as a sequential process, many of the operations can be performed in parallel or concurrently. In addition, the order of the operations may be re-arranged. A process is terminated when its operations are completed. A process may correspond to a method, a procedure, an algorithm, etc. The operations of methods may be performed in whole or in part, may be performed in conjunction with some or all of the operations in other methods, and may be performed by any number of different systems, such as the systems described herein, or any portion thereof, such as a processor included in any of the systems.

According to various configurations, each tag in the tag database receives a score based on a level of certainty that a tag can be correctly associated with a media overlay or set of media overlays. In general, there may be certain words and phrases that usually encapsulate the user's intention. The score table may be updated periodically. For example, the score table may be updated daily and/or weekly based on metrics collected by the application. According to various embodiments, the score table uses the UINT8 data type, which costs only about 1 byte per phrase/term.

A sample score table is shown in FIG. 9 in accordance with embodiments described herein. In general, there may be certain words and phrases that usually encapsulate the user's intention. For example, "I hate you" is a phrase that can highlight lot of emotion may have a score of 7 while a common phrase such as "School bus" may have a score of 2. In some cases, the generation of this model will be done on the server that employ some natural language processing (NLP) capability.

Figure 10A:
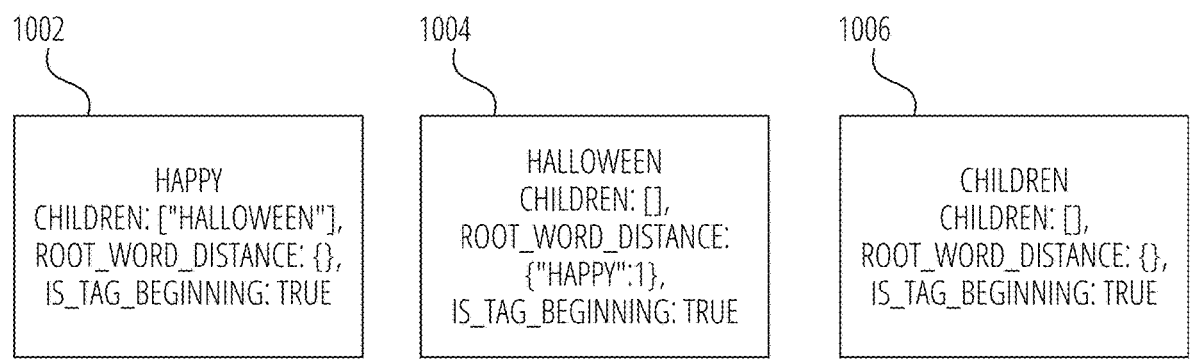
FIGS. 10A-10G show an example of determining tags for a text string on a client device in accordance with embodiments described herein.
Figure 10B:
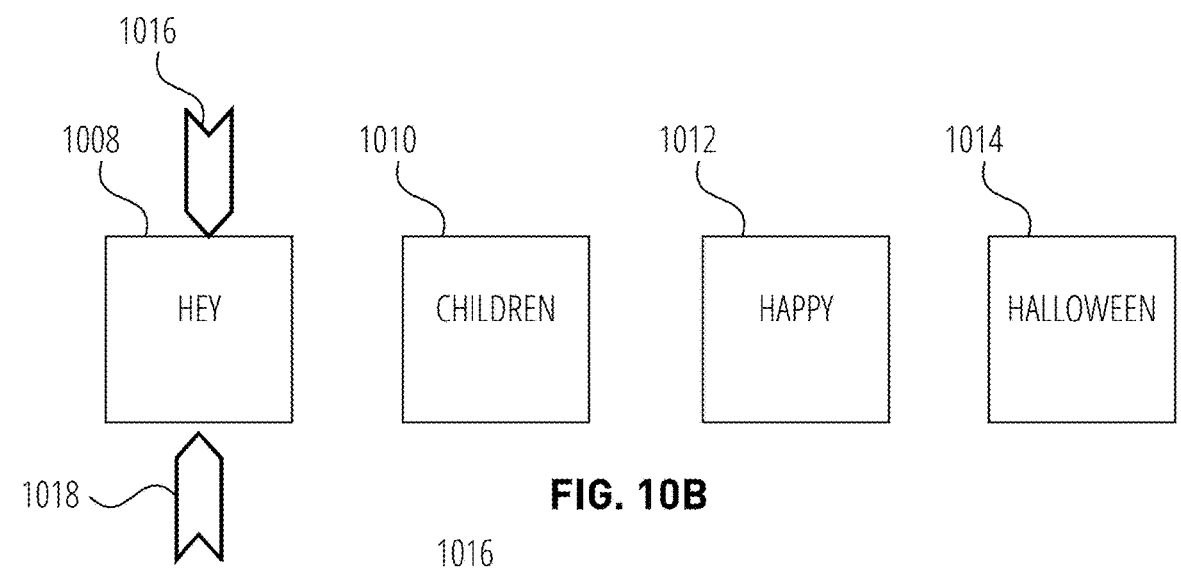
Figure 10C:
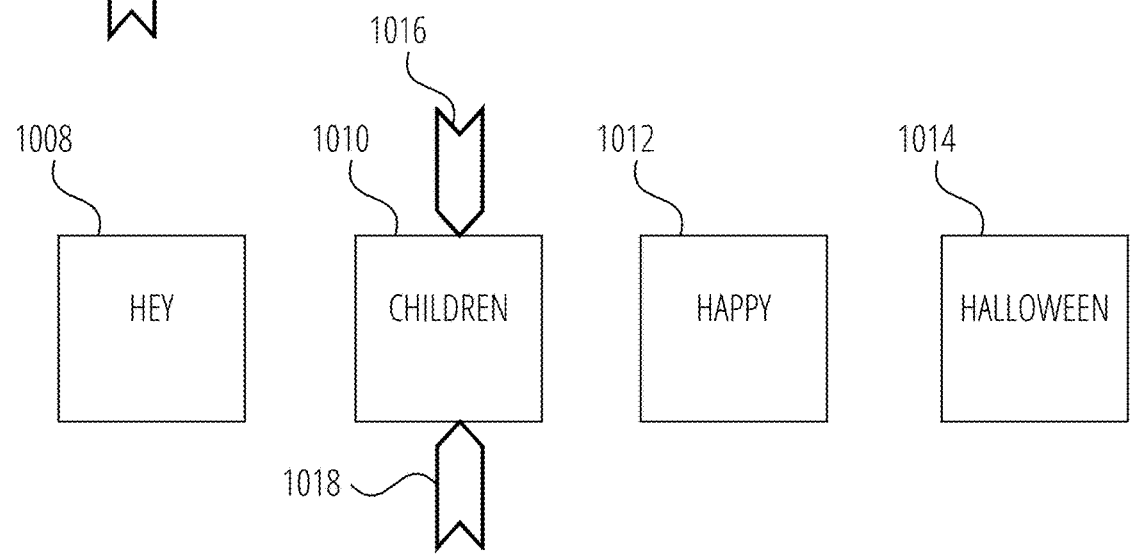
Figure 10D:
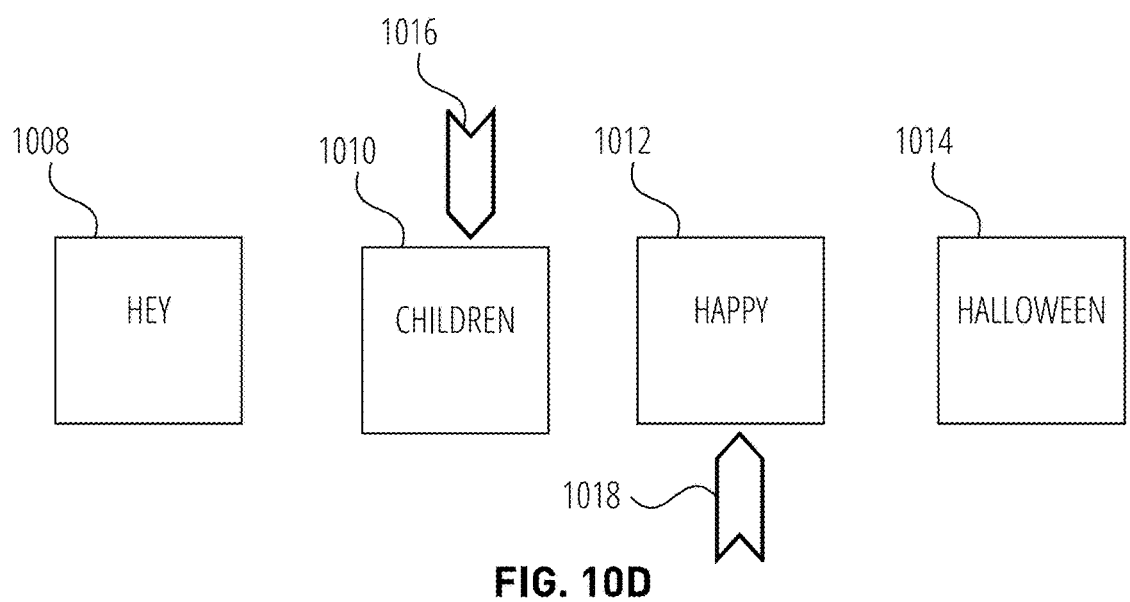
Figure 10E:
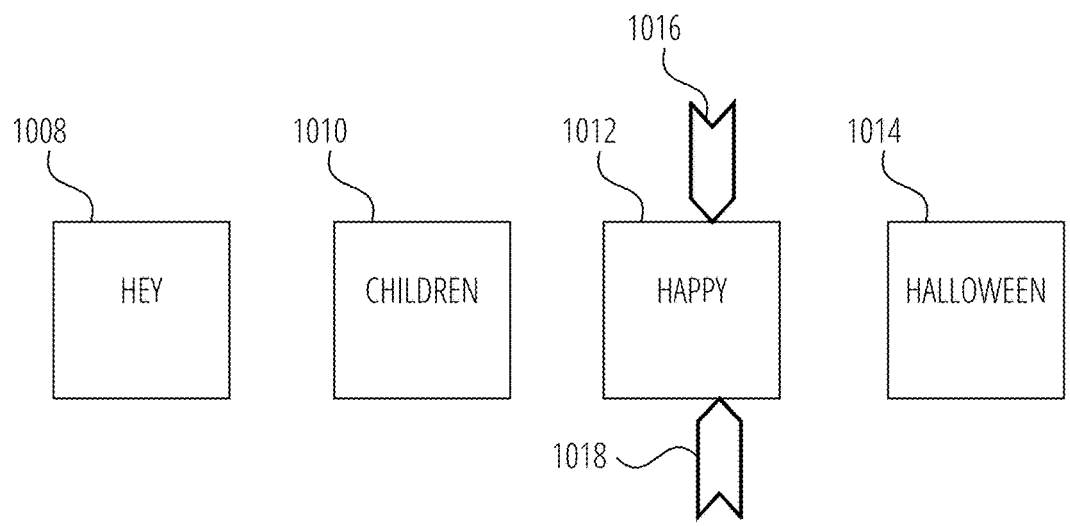
Figure 10F:
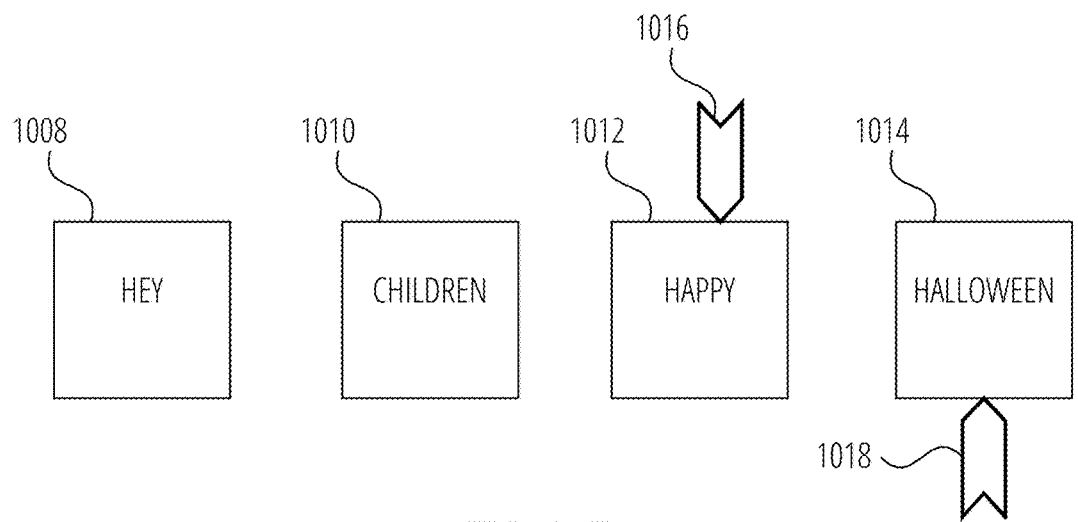

FIGS. 10A-10G show an example of determining tags for a text string on a client device in accordance with embodiments described herein. In general, all relevant tags are found for a text string. At least a portion of the media overlays in the media overlay table are ranked based on one or both of the associated tags frequency and tag score. As an example, assume we have three tags in the database: Happy 1002, Halloween 1004, children 1006, and "Happy Halloween" as shown in FIG. 10A. Here, the tag happy 1002 is found in the database. In this example, Halloween 1004 is a possible child of happy 1002. This means that Halloween 1004 is often found after happy 1002 as a tag phrase. Happy 1002 does not have any root words in the example and happy 1002 can be a start of a tag. In some cases, this may also mean that is possible that happy is not the start of one or more tags in the database. The next tag is Halloween 1004. In this example, Halloween 1004 does not have any children. This means that no tags include a word after Halloween 1004 in a text string. Halloween 1004 has a root word distance of Happy 1002 that is one word before Halloween 1004. Moving on to the third tag, children 1006, has no children and no root word so the root word distance is empty.

In this example, the IsTagBeginning indicator is set to true for each of the happy 1002, Halloween 1004, and children 1006 tags. Each of these words could be the beginning of a tag.

FIGS. 10B-10G walk through how to find tags for the example text "Hey children! Happy Halloween!" using a tag database having at least the tags shown in FIG. 10A. Of the four words found in the text, happy, Halloween, and children can be found in the tag database. The text is first parsed into individual words. In this example, the text is parsed into hey 1008, children 1010, happy 1012, and Halloween 1014. A sliding window technique is used to loop through the list of individual words. A first pointer 1016 and a second pointer 1018 start at the first word in the text. In this example, the first parsed word is hey 1008. The system determines whether hey 1008 is found in the tag graph. In this example, hey 1008 is not found in the graph and therefore there are no associated tags with this word.

Because hey 1008 is not found in the tag graph at all, the first pointer 1016 and the second pointer 1018 move on to the second word in the text string, children 1010. The system then determines whether children 1010 is found in the graph. In this example, children 1010 is found in the tag graph and can also serve as the beginning of a tag. Because children 1010 can serve as the beginning of a tag, the first pointer 1016 remains at the children 1010 node while the system determines if the children 1010 is the beginning of a tag phrase.

The second pointer 1018 moves on to the third word in the text string, happy 1012. The system then determines whether happy 1012 can follow the node children 1010. In this example, no tags exist such that happy 1012 can follow children 1010. The first pointer 1016 moves on to the happy node 1012.

Figure 10G:
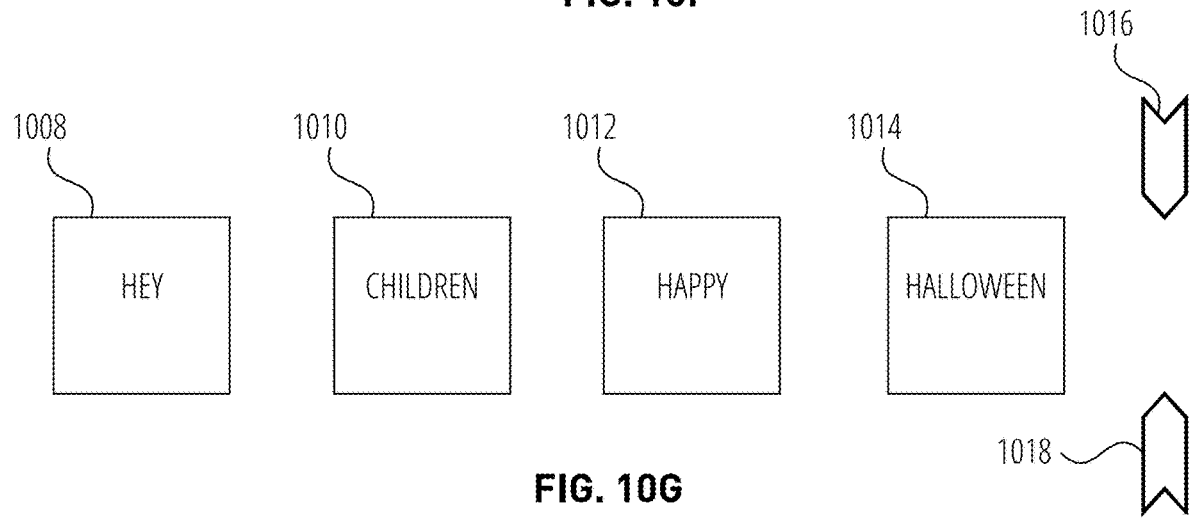

It can then be determined whether happy 1012 can serve as a tag on its own and/or as the beginning of a tag. Similarly to children 1010, happy 1012 is found in the tag graph and can also serve as the beginning of a tag so the second pointer 1018 moves on to the last word in the text string, Halloween 1014, while the first pointer 1016 remains with the happy 1012 node. The system moves on to determine whether the last word in the text, Halloween 1014 can follow happy 1012. In this example, a tag exists in the database having the phrase "Happy Halloween." Therefore, "Happy Halloween" is added to the list of tags associated with the text. The system then moves onto a potential next word in the text as shown in FIG. 10G. In this example, there are no more words to consider so the process ends, and any media overlays associated with the tag "Happy Halloween" are presented to the first user in a reply interface.

FIGS. 11A-11E show another example of determining tags for a text string in accordance with embodiments described herein. In this example, hello 1102, world 1104, series 1106, and baseball 1108 are found in the tag database. Specifically, hello 1102 has world 1104 as a possible child. Hello 1102 does not have any root words in the example and can serve as the start of a tag phrase. Moving on, world 1104 has series 1106 as a child. Series 1106 has a root word distance from hello 1102 of one. Moving on to the third tag, series 1106 has baseball 1108 as a possible child. Series 1106 has no root word, so the root word distance is empty. The last tag in the database in this example is baseball 1108. Baseball 1108 has no children and has a root world of world 1104 with a distance of two. In this example, the IsTagBeginning indicator is set to false for both of the series 1106 and baseball 1108 tag portions because neither series 1106 nor baseball 1108 serve as the beginning of a tag phrase.

Figure 11A:
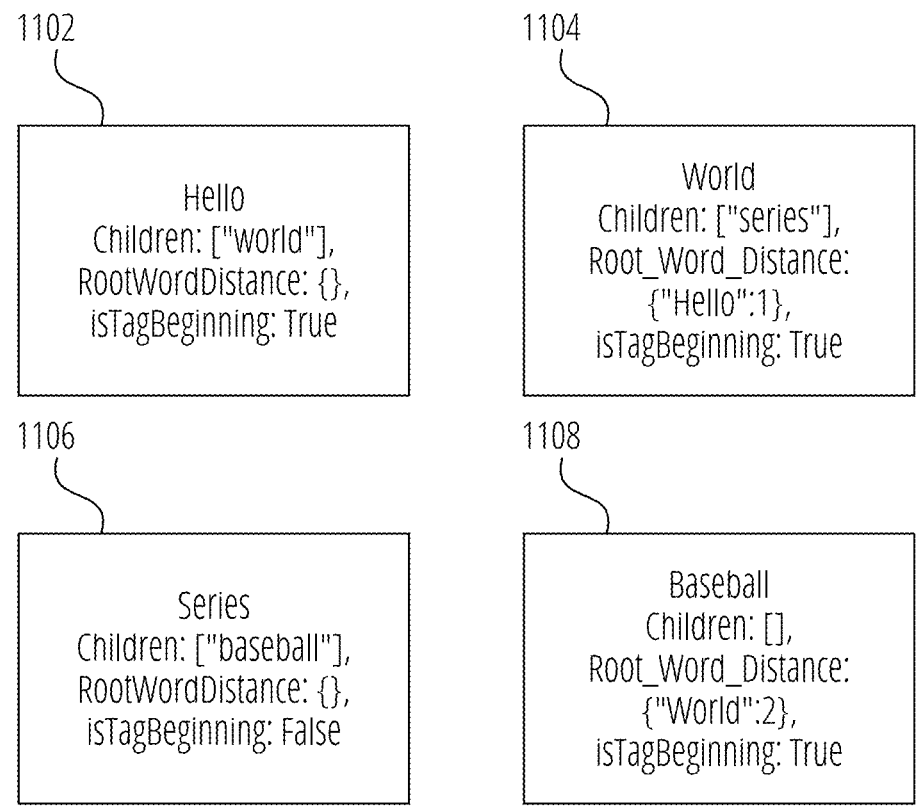
FIGS. 11A-11E illustrate another example of determining tags for a text string on a client device in accordance with some embodiments.
Figure 11B:
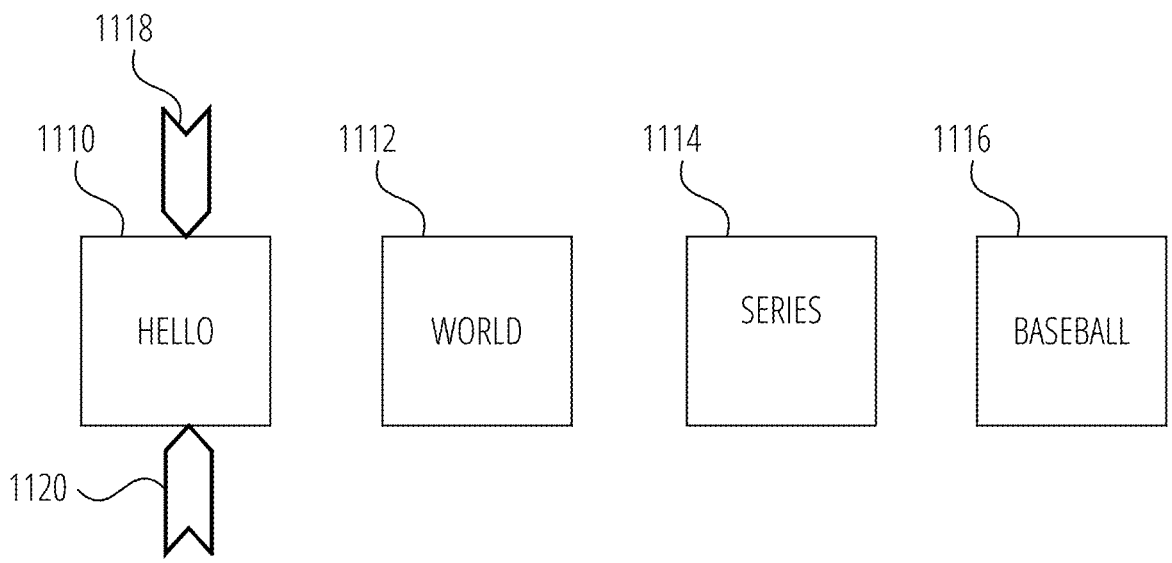
Figure 11C:
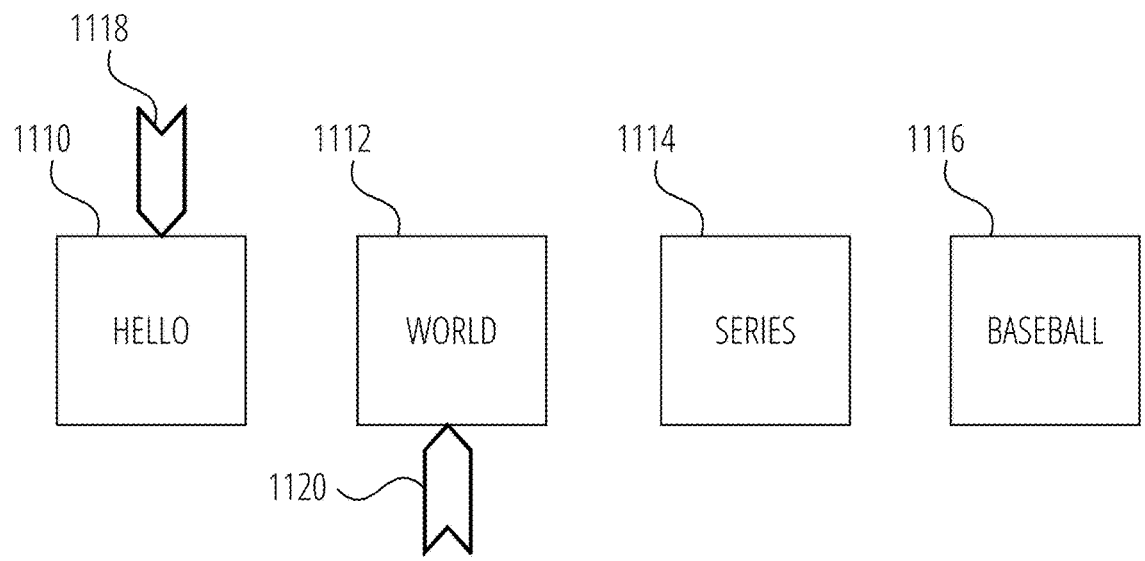
Figure 11D:
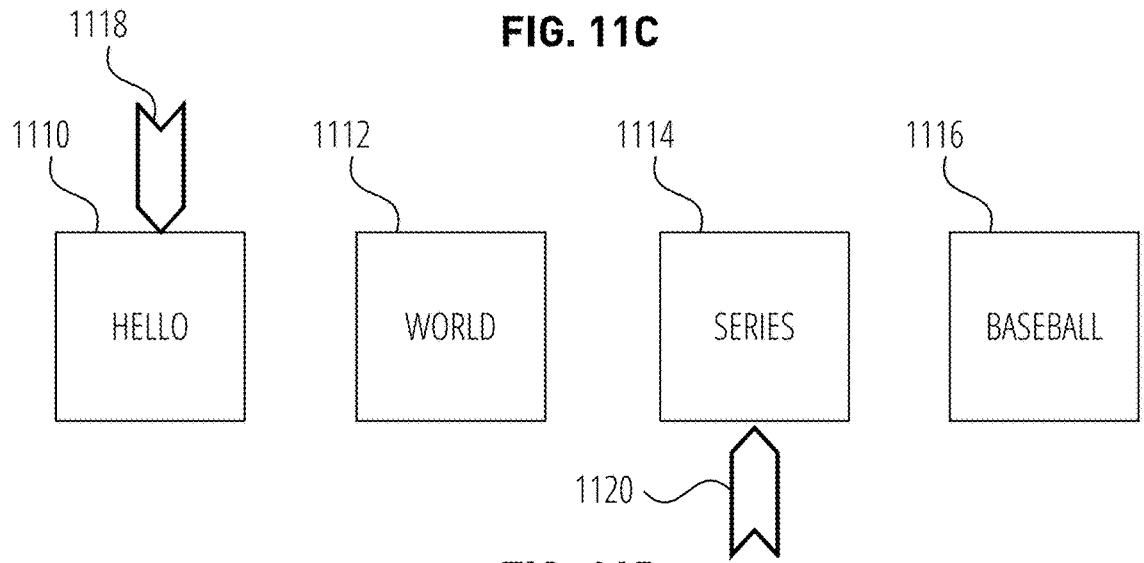
Figure 11E:
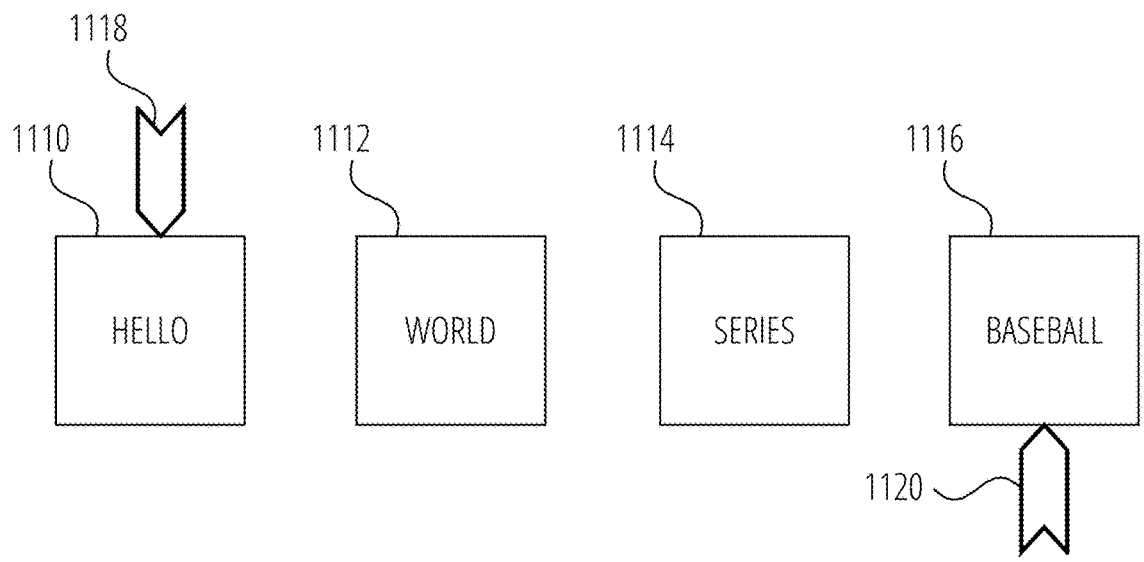

FIGS. 11B-11E walk through how to find tags for the example text "hello world series baseball" using a tag database having at least the tags shown in FIG. 11A. The text can be broken down into the individual words to determine relevant tags. Of the four words found in the text, the phrases "hello world" and "world series baseball" are found in the tag database. The text is first parsed into individual words. In this example, the text is parsed into hello 1110, world 1112, series 1114, and baseball 1116. A sliding window technique is used to loop through the list of individual words. A first pointer 1118 and a second pointer 1120 start at the first word in the text. In this example, the first parsed word is hello 1110. The system determines whether hello 1110 is found in the tag database. In this example, "hello" 1110 is found in the database and can serve as the beginning of a tag phrase.

The second pointer 1120 moves on to the second word in the text string, world 1112. The system then determines whether world 1112 can follow the node hello 1110. In this example, the database entry indicates that world 1112 can follow hello 1110 as a tag phrase. The database entry also indicates that world 1112 can be the ending to some phrases. The words hello 1110 and world 1112 are extracted as possible tag words and the phrase "hello world" can then be extracted as a potential tag phrase.

The second pointer 1120 moves on to the third word in the text string, series 1114. The system then determines whether series 1114 can follow the node world 1112. In this example, the database entry indicates that series 1114 can follow world 1112 as a tag phrase. The word series 1114 is added to the list of possible tag words and the phrase "hello world" can then be extracted as a potential tag phrase.

The second pointer 1120 moves on to the fourth word in the text string, baseball 1116. The system then determines whether baseball 1116 can follow the word series 1114. In this example, the database entry indicates that baseball 1116 can follow series 1114 as a tag phrase. Baseball 1116 can also be the ending word of some phrases. The system then checks to see if there are any possible phrases that can be extracted out starting from the first word in the potential phrase word list, hello 1110. In this example, hello 1110 is not in the rootWordDistance of the node baseball 1116 as can be observed from the database entry of baseball 1108. Therefore, the system continues to the next word in the potential phrase word list, world 1112. In this example, world 1112 is found in the baseball 1116 node and the root word distance of two matches the distance between baseball 1116 and world 1112 in the example text string. Therefore, the phrase "world series baseball" can be added to the list of tag phrases in the text and used to recommend media overlays with the relevant tag.

While the examples shown in FIGS. 10A-11E illustrate looping through the individual words in sequential order, it is to be understood that this technique can be done in any order.

Figure 12A:
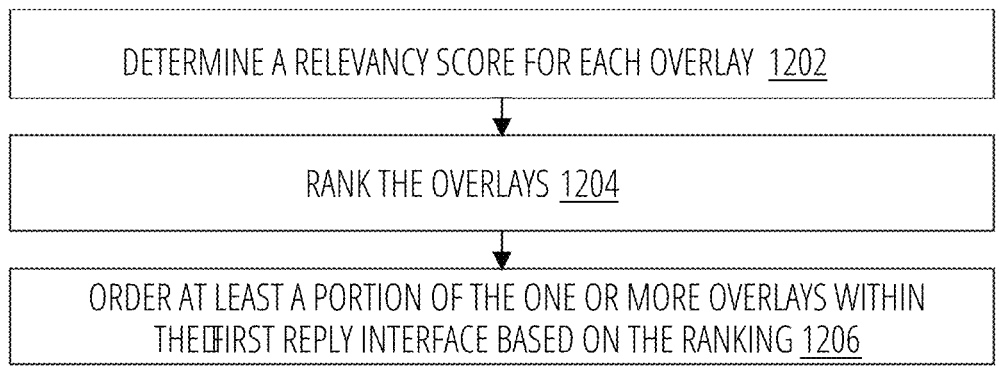
FIG. 12A illustrates a process for ordering media overlays in accordance with embodiments described herein.

According to various implementations, the one or more media overlays presented to the user are media overlays that best represent the text. FIG. 12A illustrates a process for ordering media overlays in accordance with embodiments described herein. In block 1202, the media overlay system 212 determines a relevancy score for each media overlay within the one or more media overlays based on one or more relevant tags and an assigned score for each of the one or more parsed media content items. In block 1204, the media overlay system ranks the one or more media overlays based on a number of relevant tags associated with each media overlay. In block 1206, the media overlay system 212 orders at least a portion of the one or more media overlays within a reply interface based on the ranking.

Figure 12B:
FIG. 12B illustrates an example media overlay having multiple tags associated therewith in accordance with some embodiments.

According to various configurations, the system finds one or more media overlays that overlap the most tags related to the text string. For example, the text: "What??!! I am MAD like a godzilla" can have the relevant tags: "what", "mad", "godzilla". If the system only selects media overlays associated with the "mad" tag because "mad" has the highest score, the best media overlays may not be presented. The system may rank and/or order media overlays based on the number of overlapping tags. In this example, there is a media overlay that has both "mad" and "godzilla" tags as shown in FIG. 12B and this media overlay may be the most relevant first media overlay to present.

According to various configurations, collected metrics may be used to improve media overlay selection over time. In some cases, privacy considerations do not allow to keep a log of any user. Tags associated with a text string can be uploaded to a server and serve to improve the media overlay selection model. Some example metrics that can be helpful include a number of the clicks on a particular emoji icon, denoted as "click rate". It can be observed whether the smart media overlay selection model can improve that click rate by comparing click rate before implementation of the model and after implementation. Also, the click rate may give insight into to anything changing to the media overlay selection model. Another set of metrics that can be useful includes the tags detected from smart suggest model and the media overlay that the user eventually chooses. This can help to adjust the score of tags to improve the algorithm in the future and it can help to find out what the best and/or most favorable media overlay is for a given tag.

In some cases, if a word in a text string is not present in a tag database, it may be determined whether there are any antonyms and/or synonyms that are present. The first one or more synonyms of a word in the text string that appear in the database may be chosen to represent the word for tag and/or media overlay selection. Some types of words will not have any associated antonyms and/or synonyms. For example, pronouns, proper nouns, being words, auxiliary verbs, conjunctions, prepositions, determiners, and numerals do not have any associated antonyms and/or synonyms.

Time-Based Access Limitation Architecture

Figure 13:
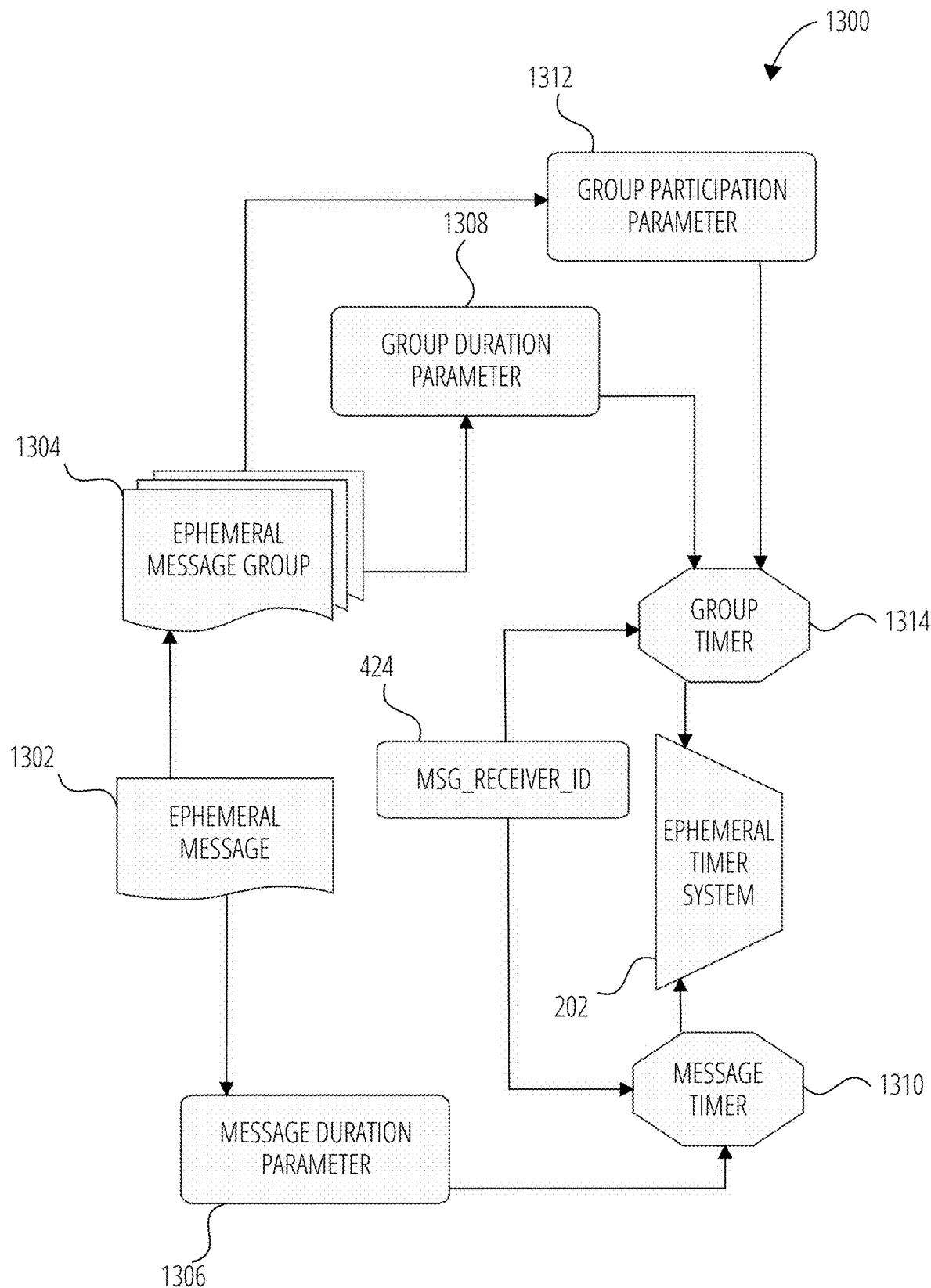
FIG. 13 is a flowchart for an access-limiting process, in accordance with some examples.

FIG. 13 is a schematic diagram illustrating an access-limiting process 1300, in terms of which access to content (e.g., an ephemeral message 1302, and associated multimedia payload of data) or a content collection (e.g., an ephemeral message group 1304) may be time-limited (e.g., made ephemeral).

An ephemeral message 1302 is shown to be associated with a message duration parameter 1306, the value of which determines an amount of time that the ephemeral message 1302 will be displayed to a receiving user of the ephemeral message 1302 by the messaging client 104. In one example, an ephemeral message 1302 is viewable by a receiving user for up to a maximum of 10 seconds, depending on the amount of time that the sending user specifies using the message duration parameter 1306.

The message duration parameter 1306 and the message receiver identifier 424 are shown to be inputs to a message timer 1310, which is responsible for determining the amount of time that the ephemeral message 1302 is shown to a particular receiving user identified by the message receiver identifier 424. In particular, the ephemeral message 1302 will only be shown to the relevant receiving user for a time period determined by the value of the message duration parameter 1306. The message timer 1310 is shown to provide output to a more generalized ephemeral timer system 202, which is responsible for the overall timing of display of content (e.g., an ephemeral message 1302) to a receiving user.

The ephemeral message 1302 is shown in FIG. 13 to be included within an ephemeral message group 1304 (e.g., a collection of messages in a personal story, or an event story). The ephemeral message group 1304 has an associated group duration parameter 1308, a value of which determines a time duration for which the ephemeral message group 1304 is presented and accessible to users of the messaging system 100. The group duration parameter 1308, for example, may be the duration of a music concert, where the ephemeral message group 1304 is a collection of content pertaining to that concert. Alternatively, a user (either the owning user or a curator user) may specify the value for the group duration parameter 1308 when performing the setup and creation of the ephemeral message group 1304.

Additionally, each ephemeral message 1302 within the ephemeral message group 1304 has an associated group participation parameter 1312, a value of which determines the duration of time for which the ephemeral message 1302 will be accessible within the context of the ephemeral message group 1304. Accordingly, a particular ephemeral message group 1304 may "expire" and become inaccessible within the context of the ephemeral message group 1304, prior to the ephemeral message group 1304 itself expiring in terms of the group duration parameter 1308. The group duration parameter 1308, group participation parameter 1312, and message receiver identifier 424 each provide input to a group timer 1314, which operationally determines, firstly, whether a particular ephemeral message 1302 of the ephemeral message group 1304 will be displayed to a particular receiving user and, if so, for how long. Note that the ephemeral message group 1304 is also aware of the identity of the particular receiving user as a result of the message receiver identifier 424.

Accordingly, the group timer 1314 operationally controls the overall lifespan of an associated ephemeral message group 1304, as well as an individual ephemeral message 1302 included in the ephemeral message group 1304. In one example, each and every ephemeral message 1302 within the ephemeral message group 1304 remains viewable and accessible for a time period specified by the group duration parameter 1308. In a further example, a certain ephemeral message 1302 may expire, within the context of ephemeral message group 1304, based on a group participation parameter 1312. Note that a message duration parameter 1306 may still determine the duration of time for which a particular ephemeral message 1302 is displayed to a receiving user, even within the context of the ephemeral message group 1304. Accordingly, the message duration parameter 1306 determines the duration of time that a particular ephemeral message 1302 is displayed to a receiving user, regardless of whether the receiving user is viewing that ephemeral message 1302 inside or outside the context of an ephemeral message group 1304.

The ephemeral timer system 202 may furthermore operationally remove a particular ephemeral message 1302 from the ephemeral message group 1304 based on a determination that it has exceeded an associated group participation parameter 1312. For example, when a sending user has established a group participation parameter 1312 of 24 hours from posting, the ephemeral timer system 202 will remove the relevant ephemeral message 1302 from the ephemeral message group 1304 after the specified 24 hours. The ephemeral timer system 202 also operates to remove an ephemeral message group 1304 when either the group participation parameter 1312 for each and every ephemeral message 1302 within the ephemeral message group 1304 has expired, or when the ephemeral message group 1304 itself has expired in terms of the group duration parameter 1308.

In certain use cases, a creator of a particular ephemeral message group 1304 may specify an indefinite group duration parameter 1308. In this case, the expiration of the group participation parameter 1312 for the last remaining ephemeral message 1302 within the ephemeral message group 1304 will determine when the ephemeral message group 1304 itself expires. In this case, a new ephemeral message 1302, added to the ephemeral message group 1304, with a new group participation parameter 1312, effectively extends the life of an ephemeral message group 1304 to equal the value of the group participation parameter 1312.

Responsive to the ephemeral timer system 202 determining that an ephemeral message group 1304 has expired (e.g., is no longer accessible), the ephemeral timer system 202 communicates with the messaging system 100 (and, for example, specifically the messaging client 104) to cause an indicium (e.g., an icon) associated with the relevant ephemeral message group 1304 to no longer be displayed within a user interface of the messaging client 104. Similarly, when the ephemeral timer system 202 determines that the message duration parameter 1306 for a particular ephemeral message 1302 has expired, the ephemeral timer system 202 causes the messaging client 104 to no longer display an indicium (e.g., an icon or textual identification) associated with the ephemeral message 1302.

Machine Architecture

Figure 14:
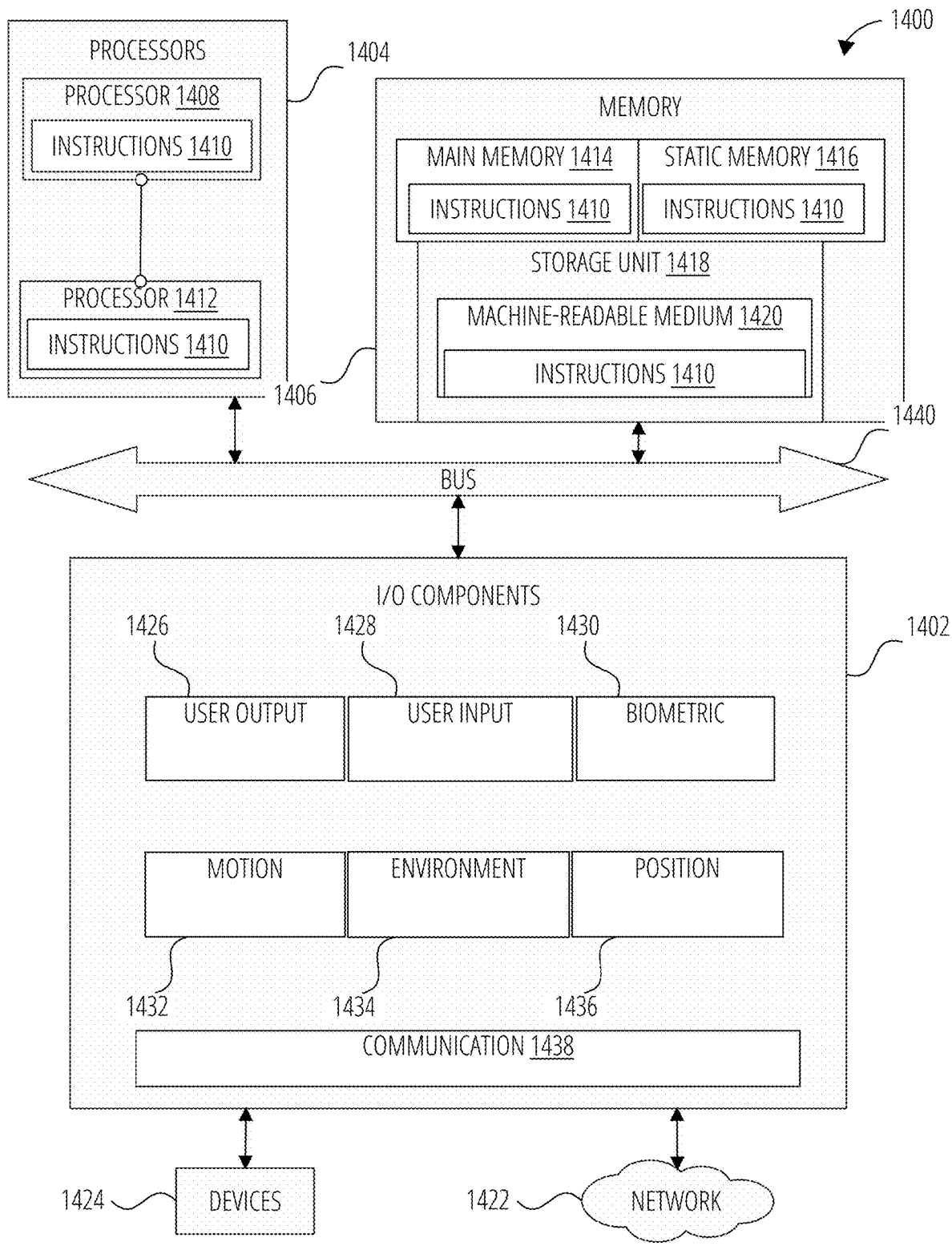
FIG. 14 is a diagrammatic representation of a machine in the form of a computer system within which a set of instructions may be executed for causing the machine to perform any one or more of the methodologies discussed herein, in accordance with some examples.

FIG. 14 is a diagrammatic representation of the machine 1400 within which instructions 1410 (e.g., software, a program, an application, an applet, an app, or other executable code) for causing the machine 1400 to perform any one or more of the methodologies discussed herein may be executed. For example, the instructions 1410 may cause the machine 1400 to execute any one or more of the methods described herein. The instructions 1410 transform the general, non-programmed machine 1400 into a particular machine 1400 programmed to carry out the described and illustrated functions in the manner described. The machine 1400 may operate as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1410, sequentially or otherwise, that specify actions to be taken by the machine 1400. Further, while only a single machine 1400 is illustrated, the term "machine" shall also be taken to include a collection of machines that individually or jointly execute the instructions 1410 to perform any one or more of the methodologies discussed herein. The machine 1400, for example, may comprise the client device 102 or any one of a number of server devices forming part of the messaging server system 108. In some examples, the machine 1400 may also comprise both client and server systems, with certain operations of a particular method or algorithm being performed on the server-side and with certain operations of the particular method or algorithm being performed on the client-side.

The machine 1400 may include processors 1404, memory 1406, and input/output I/O components 1402, which may be configured to communicate with each other via a bus 1440. In an example, the processors 1404 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1408 and a processor 1412 that execute the instructions 1410. The term "processor" is intended to include multi-core processors that may comprise two or more independent processors (sometimes referred to as "cores") that may execute instructions contemporaneously. Although FIG. 14 shows multiple processors 1404, the machine 1400 may include a single processor with a single-core, a single processor with multiple cores (e.g., a multi-core processor), multiple processors with a single core, multiple processors with multiples cores, or any combination thereof.

The memory 1406 includes a main memory 1414, a static memory 1416, and a storage unit 1418, both accessible to the processors 1404 via the bus 1440. The main memory 1406, the static memory 1416, and storage unit 1418 store the instructions 1410 embodying any one or more of the methodologies or functions described herein. The instructions 1410 may also reside, completely or partially, within the main memory 1414, within the static memory 1416, within machine-readable medium 1420 within the storage unit 1418, within at least one of the processors 1404 (e.g., within the Processor's cache memory), or any suitable combination thereof, during execution thereof by the machine 1400.

The I/O components 1402 may include a wide variety of components to receive input, provide output, produce output, transmit information, exchange information, capture measurements, and so on. The specific I/O components 1402 that are included in a particular machine will depend on the type of machine. For example, portable machines such as mobile phones may include a touch input device or other such input mechanisms, while a headless server machine will likely not include such a touch input device. It will be appreciated that the I/O components 1402 may include many other components that are not shown in FIG. 14. In various examples, the I/O components 1402 may include user output components 1426 and user input components 1428. The user output components 1426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1402 may include biometric components 1430, motion components 1432, environmental components 1434, or position components 1436, among a wide array of other components. For example, the biometric components 1430 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1432 include acceleration sensor components (e.g., accelerometer), gravitation sensor components, rotation sensor components (e.g., gyroscope).

The environmental components 1434 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1436 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1402 further include communication components 1438 operable to couple the machine 1400 to a network 1422 or devices 1424 via respective coupling or connections. For example, the communication components 1438 may include a network interface Component or another suitable device to interface with the network 1422. In further examples, the communication components 1438 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1424 may be another machine or any of a wide variety of peripheral devices (e.g., a peripheral device coupled via a USB).

Moreover, the communication components 1438 may detect identifiers or include components operable to detect identifiers. For example, the communication components 1438 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1438, such as location via Internet Protocol (IP) geolocation, location via Wi-Fi® signal triangulation, location via detecting an NFC beacon signal that may indicate a particular location, and so forth.

The various memories (e.g., main memory 1414, static memory 1416, and memory of the processors 1404) and storage unit 1418 may store one or more sets of instructions and data structures (e.g., software) embodying or used by any one or more of the methodologies or functions described herein. These instructions (e.g., the instructions 1410), when executed by processors 1404, cause various operations to implement the disclosed examples.

The instructions 1410 may be transmitted or received over the network 1422, using a transmission medium, via a network interface device (e.g., a network interface component included in the communication components 1438) and using any one of several well-known transfer protocols (e.g., hypertext transfer protocol (HTTP)). Similarly, the instructions 1410 may be transmitted or received using a transmission medium via a coupling (e.g., a peer-to-peer coupling) to the devices 1424.

Software Architecture

Figure 15:
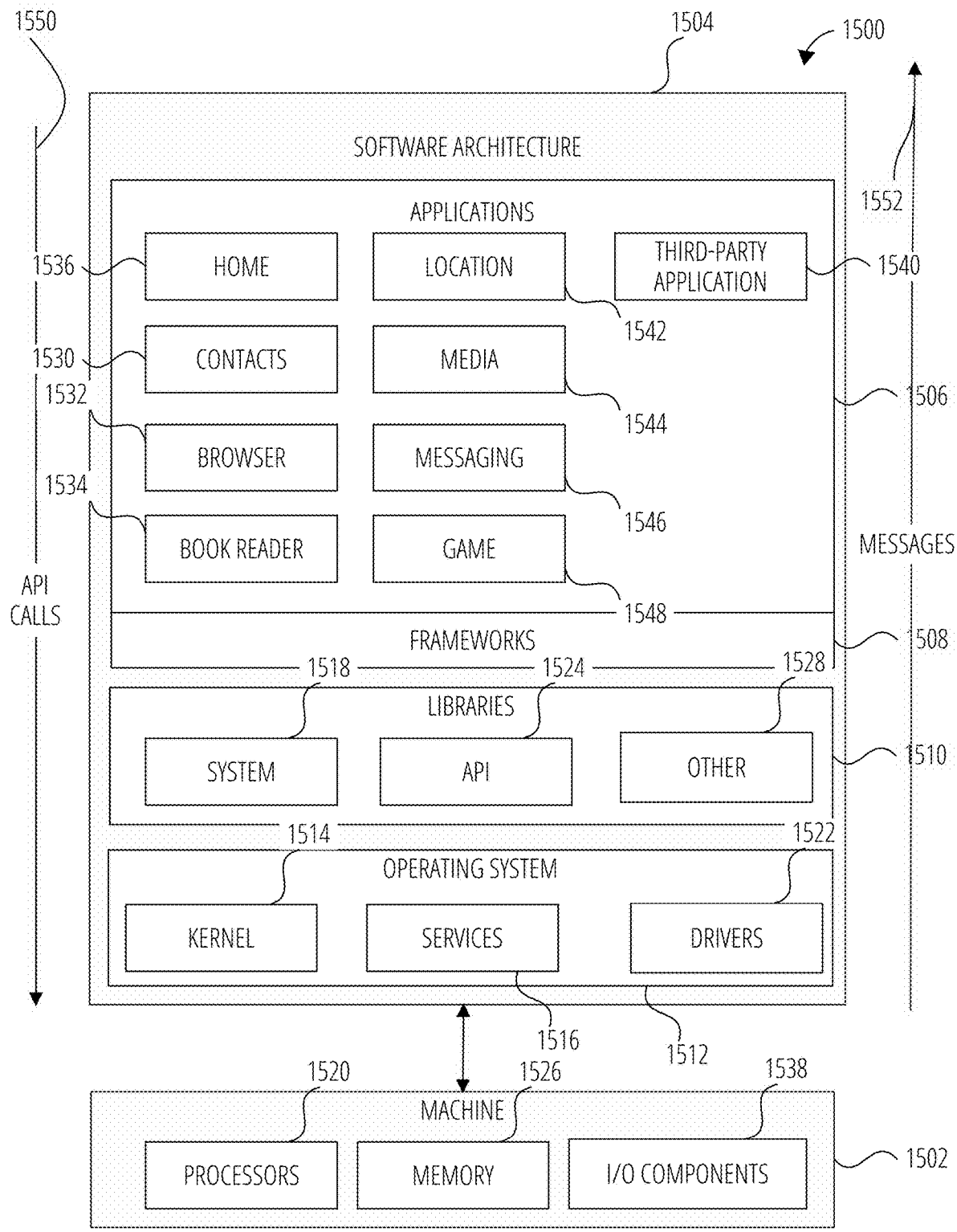
FIG. 15 is a block diagram showing a software architecture within which examples may be implemented.

FIG. 15 is a block diagram 1500 illustrating a software architecture 1504, which can be installed on any one or more of the devices described herein. The software architecture 1504 is supported by hardware such as a machine 1502 that includes processors 1520, memory 1526, and I/O components 1538. In this example, the software architecture 1504 can be conceptualized as a stack of layers, where each layer provides a particular functionality. The software architecture 1504 includes layers such as an operating system 1512, libraries 1510, frameworks 1508, and applications 1506. Operationally, the applications 1506 invoke API calls 1550 through the software stack and receive messages 1552 in response to the API calls 1550.

The operating system 1512 manages hardware resources and provides common services. The operating system 1512 includes, for example, a kernel 1514, services 1516, and drivers 1522. The kernel 1514 acts as an abstraction layer between the hardware and the other software layers. For example, the kernel 1514 provides memory management, processor management (e.g., scheduling), component management, networking, and security settings, among other functionality. The services 1516 can provide other common services for the other software layers. The drivers 1522 are responsible for controlling or interfacing with the underlying hardware. For instance, the drivers 1522 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1510 provide a common low-level infrastructure used by the applications 1506. The libraries 1510 can include system libraries 1518 (e.g., C standard library) that provide functions such as memory allocation functions, string manipulation functions, mathematic functions, and the like. In addition, the libraries 1510 can include API libraries 1524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1510 can also include a wide variety of other libraries 1528 to provide many other APIs to the applications 1506.

The frameworks 1508 provide a common high-level infrastructure that is used by the applications 1506. For example, the frameworks 1508 provide various graphical user interface (GUI) functions, high-level resource management, and high-level location services. The frameworks 1508 can provide a broad spectrum of other APIs that can be used by the applications 1506, some of which may be specific to a particular operating system or platform.

In an example, the applications 1506 may include a home application 1536, a contacts application 1530, a browser application 1532, a book reader application 1534, a location application 1542, a media application 1544, a messaging application 1546, a game application 1548, and a broad assortment of other applications such as a third-party application 1540. The applications 1506 are programs that execute functions defined in the programs. Various programming languages can be employed to create one or more of the applications 1506, structured in a variety of manners, such as object-oriented programming languages (e.g., Objective-C, Java, or C++) or procedural programming languages (e.g., C or assembly language). In a specific example, the third-party application 1540 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1540 can invoke the API calls 1550 provided by the operating system 1512 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method, the method comprising:
receiving, by a first device, a text string inputted by a second user into chat text of a messaging client, the messaging client enabling communication between the second user of a second device and a first user of the first device; and
in response to receiving the text string inputted into the chat text, automatically by the first device:
parsing the text string into one or more text portions;
determining one or more relevant tags of a plurality of tags based on the one or more parsed text portions;
identifying a root word in an individual text portion based on the one or more relevant tags;
identifying associated children words for the identified root word, the children words being in the individual text portion;
assigning scores for the one or more parsed text portions of the text string by:
generating a first score for the identified root word; and
generating a second set of scores for the identified children words associated with the identified root word;
selecting a media overlay of a plurality of media overlays based on the one or more relevant tags and a plurality of scores, the selecting of the media overlay comprising selecting the media overlay that corresponds to the plurality of scores including (1) the first score corresponding to the identified root word, and (2) the second set of scores corresponding to the identified children words; and
displaying the selected media overlay adjacent to the text string within the chat text of the messaging client enabling the first device to send a reply message that includes the selected media overlay to the second device.

2. The method of claim 1, wherein the selected media overlay corresponds to a predefined overlay for displaying in a predefined order.

3. The method of claim 1, further comprising:
determining a relevancy score for each of the plurality of media overlays that includes the selected media overlay based on the individual one or more relevant tags and the generated first and second scores for each of the one or more parsed text portions; and
ordering the selected media overlay with other media overlays within the chat text based on the determined relevancy score of each of the plurality of media overlays.

4. The method of claim 3 wherein the method further includes ranking media overlays that includes the selected media overlay based on a number of relevant tags associated with each media overlay of the media overlays.

5. The method of claim 1, further comprising:
receiving, via the chat text, user selection of the selected media overlay among other media overlays; and
providing, by the first device, for transmission of the selected media overlay to the second device.

6. The method of claim 1, wherein the first user and the second user correspond to contacts within a messaging application running on each of the first device and the second device.

7. The method of claim 1, wherein determining the one or more relevant tags based on the one or more parsed text portions comprises iteratively scanning through each text portion of the text string.

8. The method of claim 1, wherein the first score is based on a specified criterion, the specified criterion is updated at specified intervals.

9. The method of claim 1, wherein each of the one or more relevant tags have an associated score and selecting the media overlay comprises selecting the media overlay based on the associated score of the one or more relevant tags.

10. The method of claim 1, wherein the text string comprises one or more of words, phrases, and emoji.

11. The method of claim 1, wherein the one or more parsed text portions comprise one or more words; and
determining one or both of a synonym and an antonym of at least one of the one or more words, wherein determining the one or more relevant tags comprises determining the one or more relevant tags based on one or both of the synonym and the antonym.

12. The method of claim 1, wherein the first score for the identified root word and the second set of scores for the identified children words each correspond to an emotion of individual words, the emotion reflecting a mood of the second user, the selected media overlay being selected based on the first score and the second set of scores corresponding to individual emotions.

13. The method of claim 12, wherein at least one of the first score for the identified root word or the second set of scores for the identified children words correspond to an amount of the emotion of the second user, the selected media overlay being selected based on the amount of the emotion.

14. The method of claim 1, wherein the operations further comprise:
selecting a set of media overlays by randomly selecting the set of media overlays from the plurality of media overlays, wherein selecting the media overlay of the plurality of media overlays comprises selecting the media overlay of the set of media overlays.

15. A computing apparatus, comprising:
at least one processor; and
a memory storing instructions that, when executed by the at least one processor, configure the computing apparatus to perform one or more operations comprising:
receiving a text string inputted by a second user into chat text of a messaging client, the messaging client enabling communication between the second user of a second device and a first user of the computing apparatus; and
in response to receiving the text string inputted into the chat text, automatically:
parsing the text string into one or more text portions;
determining one or more relevant tags of a plurality of tags based on the one or more parsed text portions;
identifying a root word in an individual text portion based on the one or more relevant tags;
identifying associated children words for the identified root word, the children words being in the individual text portion;
assigning scores for the one or more parsed text portions of the text string by:
generating a first score for the identified root word; and
generating a second set of scores for the identified children words associated with the identified root word;
selecting a media overlay of a plurality of media overlays based on the one or more relevant tags and a plurality of scores, the selecting of the media overlay comprising selecting the media overlay that corresponds to the plurality of scores including (1) the first score corresponding to the identified root word, and (2) the second set of scores corresponding to the identified children words; and
displaying the selected media overlay adjacent to the text string within the chat text of the messaging client enabling sending of a reply message that includes the selected media overlay to the second device.

16. The computing apparatus of claim 15, wherein the selected media overlay corresponds to a predefined overlay for displaying in a predefined order.

17. The computing apparatus of claim 15, wherein the computing apparatus is further configured to:
determining a relevancy score for each of the plurality of media overlays that includes the selected media overlay based on the individual one or more relevant tags and the generated first and second scores for each of the one or more parsed text portions; and
ordering the selected media overlay with other media overlays within the chat text based on the determined relevancy score of each of the plurality of media overlays.

18. The computing apparatus of claim 17, wherein the computing apparatus is further configured to ranking media overlays that includes the selected media overlay based on a number of relevant tags associated with each media overlay of the media overlays.

19. The computing apparatus of claim 15, wherein the computing apparatus is further configured to:
receiving, via the chat text, user selection of the selected media overlay among other media overlays; and
providing the selected media overlay to the second device.

20. A non-transitory computer-readable storage medium, the computer-readable storage medium including instructions that when executed by a computer, cause the computer to perform one or more operations comprising:
receiving a text string inputted by a second user into chat text of a messaging client, the messaging client enabling communication between the second user of a second device and a first user of the computer; and
in response to receiving the text string inputted into the chat text, automatically:
parsing the text string into one or more text portions;
determining one or more relevant tags of a plurality of tags based on the one or more parsed text portions;
identifying a root word in an individual text portion based on the one or more relevant tags;
identifying associated children words for the identified root word, the children words being in the individual text portion;
assigning scores for the one or more parsed text portions of the text string by:
generating a first score for the identified root word; and
generating a second set of scores for the identified children words associated with the identified root word;
selecting a media overlay of a plurality of media overlays based on the one or more relevant tags and a plurality of scores, the selecting of the media overlay comprising selecting the media overlay that corresponds to the plurality of scores including (1) the first score corresponding to the identified root word, and (2) the second set of scores corresponding to the identified children words; and displaying the selected media overlay adjacent to the text string within the chat text of the messaging client enabling sending of a reply message that includes the selected media overlay to the second device.

* * * * *